US006903741B2

(12) United States Patent
Corbetta

(10) Patent No.: US 6,903,741 B2
(45) Date of Patent: Jun. 7, 2005

(54) METHOD, COMPUTER PROGRAM PRODUCT AND SYSTEM FOR RENDERING SOFT SHADOWS IN A FRAME REPRESENTING A 3D-SCENE

(75) Inventor: Marco Corbetta, Coburg (DE)

(73) Assignee: Crytek GmbH, Coburg (DE)

( * ) Notice: Subject to any disclaimer, the term of this patent is extended or adjusted under 35 U.S.C. 154(b) by 217 days.

(21) Appl. No.: 10/022,133

(22) Filed: Dec. 13, 2001

(65) Prior Publication Data

US 2003/0112237 A1 Jun. 19, 2003

(51) Int. Cl.$^7$ .............................................. G06T 15/00
(52) U.S. Cl. ..................................................... 345/426
(58) Field of Search .............................. 345/426, 422, 345/473, 474

(56) References Cited

U.S. PATENT DOCUMENTS

| | | | | |
|---|---|---|---|---|
| 5,742,292 | A | 4/1998 | Murata | 345/426 |
| 5,742,749 | A | 4/1998 | Foran et al. | 395/126 |
| 5,805,782 | A | 9/1998 | Foran | 395/126 |
| 5,880,736 | A | * 3/1999 | Peercy et al. | 345/426 |
| 5,999,185 | A | * 12/1999 | Kato et al. | 345/420 |
| 6,208,361 | B1 | 3/2001 | Gossett | 345/508 |
| 6,252,608 | B1 | 6/2001 | Snyder et al. | 345/473 |

OTHER PUBLICATIONS

Ronald Frazier, "Real–Time Per–Pixel Point Lights and Spot Lights in OpenGL" Sep. 13, 2000 www.ronfrazier.net/apparition.*

Ronald Frazier, "Advanced Real–Time Per–Pixel Point Lights and Spot Lights in OpenGL" Sep. 13, 2000 www.ronfrazier.net/apparition.*

Ronald Frazier, "Index Cube Shadow Mapping in OpenGL" Sep. 13, 2000 www.ronfrazier.net/apparition.*

Blin; Me and My (Fake) Shadow; *IEEE Computer Graphics& Applications;* Jan. 1988; pp. 82–86.

Hubert; "Casting Shadows on Volumes"; *Game Developer,* vol. 6, Mar. 1999.

(Continued)

*Primary Examiner*—Almis R. Jankus
(74) *Attorney, Agent, or Firm*—Renner, Otto, Boisselle & Sklar, LLP

(57) ABSTRACT

A method, computer program product and system for rendering soft shadows in an image or frame representing a 3D scene, comprising the steps, from a light's point of view, of detecting and creating a list of edges casting shadows, a list of soft shadow edges and a list of shadow volumes polygons; rendering said soft shadow edges into one or more sides of a cubemap, rendering said shadow volume polygons in combination with a stencil buffer to detect full shadowed areas; from a viewer's point of view rendering said scene with said cubemap applied while performing a stencil test operation for preventing the scene to be drawn in shadowed areas, to produce a soft shadowed image.

In addition, the system supports the re-use of the shadow volumes and cubemap information for more than one frame.

22 Claims, 12 Drawing Sheets

OTHER PUBLICATIONS

Parker et al.; "Single Sample Soft Shadows"; Technical Report UUCS–98–019, Computer Science Department, University of Utah, 1998.

Reeves et al.; "Rendering Antialiased Shadows with Depth Maps"; Computer Graphics; vol. 21, No. 4, Jul. 1987.

Williams; "Casting Curved Shadows on Curved Surfaces"; Computer Graphics Lab, New York Institute of Technology; Aug. 1978, 12(3), pp. 270–274.

Heckbert et al.; Simulating Soft Shadows with Graphics Hardware; Technical Report CMU–CS–97–104, Carnegie Mellon University, Jan. 1997.

Crow; "Shadow Algorithms for Computer Graphics"; Computer Graphics, Siggraph 1977 Proceedings, 242–248, Jul. 1977.

Bergeron; "A General Version of Crow's Shadow Volumes"; IIEEE Interactive Computer Graphics and Applications; Sep. 1986.

Diefenbach; "Pipeline Rendering: Interactive Refractions, Reflections, and Shadows"; Displays: Special issue on interactive computer graphics; 15(3): 173–180, 1994.

Udeshi et al.; "Towards Interactive Photorealistic Rendering of Indoor Scenes: A Hybrid Approach"; Rendering Techniques '99 (Proc. of Eurographics Rendering Workshop); 63–76, Jun. 1999.

"Vertex Shader Shadow Volume"; NVIDIA Effect Browser, Aug. 10, 2001, Copyright 1999–2001, NVIDIA Corporation, www.nvidia.com.

Sander et al.; "Silhouette Clipping"; Proceedings of SIGG-RAOH 2000, pp. 327–334, Jul. 2000.

Dietrich; "Shadow Techniques"; NVIDIA Corporation, technical presentation; www.nvidia.com/developer, GDC 2001 presentation.

Wynn et al.; "Cube Maps"; NVIDIA Corporation, technical presentation, www.nvidia.com/developer, unknown date.

Kilgard; "Improving Shadows and Reflections via the Stencil Buffer"; NVIDIA Corporation, technical presentation, www.nvidia.com/developer, unknown date.

* cited by examiner

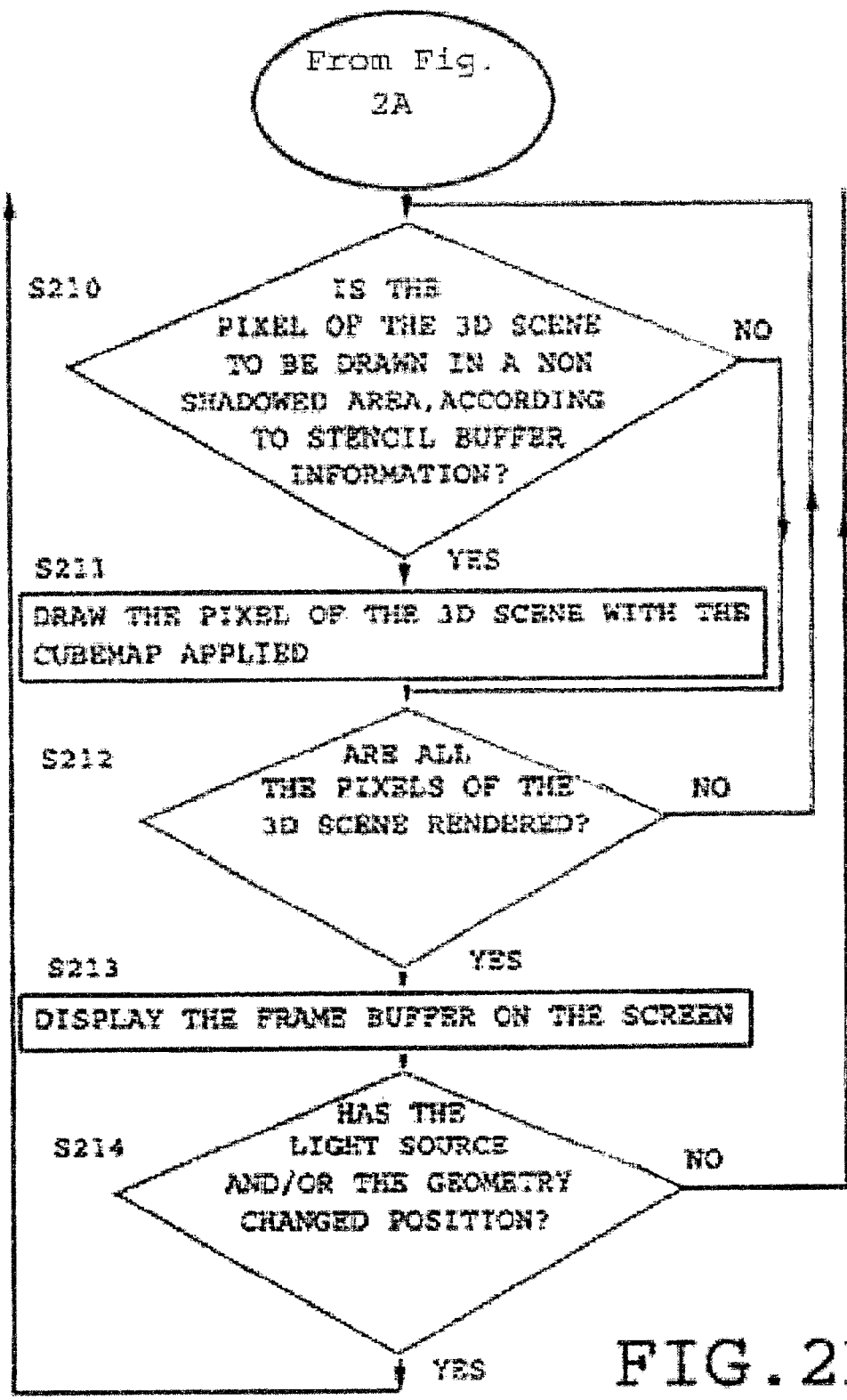

METHOD, COMPUTER PROGRAM PRODUCT AND SYSTEM FOR RENDERING SOFT SHADOWS IN A FRAME REPRESENTING A 3D-SCENE

TECHNICAL FIELD

The invention relates generally to computer graphics rendering, and more specifically relates to a method, a computer program product and a system for computing and rendering soft shadows in a frame representing a three-dimensional scene. A preferred application is the rendering of soft shadows in graphics rendering systems and interactive applications, in particular games software for PC or video games or games for game or video consoles.

BACKGROUND

A major objective in graphics rendering is to produce images that are so realistic that the observer believes the image is real. A major difficulty in achieving total visual realism is the complexity and time-consuming rendering of accurately representing real world visual effects. For the generation of images or sequences of frames in interactive applications like video games, it is desirable to minimize such computations.

Otherwise, interactive manipulation of an image or video frame can result in unacceptable delays in the rendering of the image or video frame.

It is well-known that the addition of shadows to the rendering of a scene can greatly enhance the realism of the scene and the understanding of that model's geometry, because shadows give a two-dimensional image a three-dimensional appearance. It is also known that soft shadows help to significantly enhance the realism and quality of the scene being rendered. Soft shadows in the real world are often the result of area light sources. This accounts for much (but not all) of the "softness" associated with shadow boundaries. This soft region of a shadow, in the following to be referred to as 'soft shadows', is also known as the penumbra in the prior art.

In interactive applications, shadow computations are mostly performed by either the shadow volume or the shadow map algorithm. However, shadows thus rendered have a hard edge, are blocky or are uniformly blurred along the shadow edges. According to one known alternative to the common shadows algorithms to create soft shadows a multiple pass computation of the shadow edges is performed where a point light source casting shadows is incrementally moved in the scene thus modelling a real world's area light source as a collection of distinct point light sources. The shadow edges are computed for each pass of this computation with e.g. decreasing light source's intensity or gradually decreasing shadow darkness until fill ambient brightness is finally reached or by means of suitable blending techniques. It has been found by the inventor that for computing realistic soft shadows at least sixteen or more passes have to be performed. A disadvantage of this approach is that it requires a large amount of samples of the light source and that it increases the rendering time immensely. Therefore, multiple pass rendering of soft shadows is often inappropriate for high-speed interactive applications like in games software where objects may move in the scene rapidly thus requiring a rapid computation and rendering of the scene e.g. from the object's point of view without delay.

Since shadows are a very important graphical effect, intense efforts have been made by a number of researchers on how to include shadows in interactive applications. In the following some further approaches known from the prior art will be summarized. For this purpose reference is made to the appendix of this application summarizing some prior art references. For the purpose of disclosure in this application all these documents are explicitly hereby incorporated by reference.

According to Blinn [1] shadows are generated and rendered by projecting the shadow casting object's polygons onto a ground plane. A more general method is to generate a texture containing a single shadow cast object and then project this texture onto the objects receiving the shadows [3,4], but is still difficult with this method to handle omni directional light sources, where the light sources cast shadows in all directions, and multiple objects casting shadows each others obtaining self-shadows.

One approach to perform shadowing is to use the Z-buffer that may be included on recent consumer videocards and the like and depth maps to calculate shadows as explained by W. T. Reeves in [5], and by L. Williams in [6]. This depth map algorithm can cause artifacts because only a single Z-value is stored for each element in the depth map. Assume for example that a Z-value in the depth map represents the distance of a single point on a curved object. In affect, the shadow depth map improperly represents the curved surface because it assumes that a region around the point has a constant Z-value. Actually, pixels around this single point have slightly higher or lower Z-values. Thus, when these pixels are transformed into light space coordinates and compared with the single depth value in the depth map, they may be erroneously determined to be shadowed.

Another drawback of these methods, is that the shadows have a hard or blocky edge; even if a bilinear filtering is applied to the depth maps, as is possible on recent consumer video cards, the resulting shadows are not smooth enough for rendering realistic 3D scenes. To solve this problem, Heckbert and Herf [7] render a large number of times the hard edged planar projections of the shadow caster—similar to the 'multiple pass approach' described above—and average the result. However, this process increases the rendering time dramatically, due to the large number of passes required to obtain a smooth penumbra.

Another limitation of the depth map method is that it is based on a single square depth map texture, so that the light source is assumed to be a spotlight casting shadows only in a predefined direction. In contrast, in real world a light source is usually an omni directional light source, i.e. a light source casting shadows in all directions.

A general purpose shadow algorithm known in the prior art is the shadow volume algorithm, originally developed by Crow [8]. This algorithm uses the hardware stencil buffer and, on recent consumer video cards, the shadow volume algorithm can be completely implemented in hardware [12]. While being a general solution capable of handling correctly any type of shadow interactions among objects, the shadows generated by this method still present hard edges thus rendering a 3D-scene not realistic enough.

It is an object of the present invention to provide an improved method for high-speed computing and rendering soft shadows in an image or video frame representing a three-dimensional scene.

The method according to the present invention may be implemented by means of software, hardware or a combination of appropriate software and hardware. Accordingly, it is a further object of the present invention to provide a computer program product and a system for high-speed computing and rendering soft shadows in an image or video frame representing a three-dimensional scene.

A preferred application is the generation of interactive images e.g. in games software. Preferably the generation and rendering is to be extended to all objects present in the scene and to one or more omni directional light sources casting shadows in the scene.

SUMMARY OF THE INVENTION

According to the present invention the above objects are solved by a method, a computer program product and a system for rendering soft shadows in a frame representing a three-dimensional scene as claimed by the independent claims. Further advantageous embodiments are the subject-matter of the dependent claims.

According to a first aspect of the present invention there is provided a method for rendering soft shadows in a frame representing a three-dimensional scene comprising a plurality of three-dimensional objects, said method comprising the steps of:

receiving a list of polygons defining said three-dimensional scene;

from a light source's point of view:
determining edges casting shadows from said list of polygons;
computing shadow volumes and soft shadow edges from said edges casting shadows;
creating up to six squared empty textures of the same size, each of them becoming a face of a cubemap representing a cube centered at the light source's point of view, said faces of said cubemap being aligned with orthogonal major axes with the light source's position as origin;
rendering into at least one face of said cubemap the appropriate part of said scene with full brightness color and said soft shadow edges while interpolating color or alpha values between the vertex color or alpha values of said soft shadow edges and the vertex color or alpha values of said edges casting shadows thereby generating a representation of soft edges into said at least one face of said cubemap;

from a point of view of a viewer viewing said scene:
rendering a visible part of the scene into a z-buffer with colors, lighting and texture information disabled for generating depth information;
rendering said shadow volumes into a stencil buffer in combination with said z-buffer information; and
in a single pass, rendering said scene with colors, lighting and texture information enabled and applying said cubemap to said scene for rendering said representation of said soft shadows into said scene using a texture coordinate generation while performing a stencil test operation for preventing the scene to be drawn in shadowed areas, to produce a soft shadowed image.

Accordingly, one important aspect according to the present invention is the use of so-called cubemaps for soft shadow rendering. In the prior art, cubemaps have been used hitherto to create refraction, reflections and environment mapping operations as explained more detailed in [15]. However, they have not been used before to create soft shadows. It has been found by the inventor that a cubemap is a very helpful and versatile tool to speed up soft shadow rendering.

A cubemap as used according to the present invention comprises up to six squared textures each representing a face of a cube with a light source in the center of the cube. Into at least one face or into each face of the cubemap the soft shadow representations are rendered as seen from the center of the cube in the direction of the face with light irradiated from the light source at the cube's center towards the respective face and onto all objects of the 3D-scene that can be seen from the cube's center in the direction of the respective face. A clear advantage of this approach is that if in a 3D scene the light source and the position of objects casting shadows does not change the scene can be rendered at significantly increased speed as the cubemap and shadow volumes information calculated for a previous frame of an animation may be re-used thus saving computing time. For the subsequent frame simply the cubemap and shadow volumes, which have been calculated for a previous frame, are cast again and in one pass over the objects of the scene with colors, lighting and textures for the 3D objects in the scene enabled.

According to a preferred embodiment a cubemap with all six possible faces is used which thus comprises soft shadow edges information in all six possible orthogonal directions of 3D space simultaneously. Hence, even for rapid and/or abrupt changes of the viewer's direction of view from one frame to a subsequent frame, e.g. for the case of a rapid change of 90° (pan) towards another major axis, the cubemap may be cast immediately and without further complicated calculations over the 3D scene as the information on the soft shadows is already contained in the cubemap of a previous frame. According to the invention the individual faces and arbitrary directions of view may be addressed and read out from the cubemap as required.

Another important aspect of the invention relates to the method to avoid the pixel to be drawn in shadowed areas; it will be apparent to one skilled in the art that when using complex lighting models, rejecting a pixel before applying to that pixel complex lighting calculations can speed up the rendering of the scene.

In a preferred embodiment stencil buffering and a stencil test operation is performed for this purpose. It is determined simultaneously pixel per pixel whether the pixel at the corresponding position in 3D space is in a shadow volume, i.e. lies within one or more of the usually frustrum-shaped shadow volumes cast by an occluding object positioned between the respective light source casting shadows and the respective volume element corresponding to the pixel. To this end a stencil buffer for storing integer values is used that is empty in the beginning, i.e. reset to a 'neutral' value like the nil (0) value.

According to the preferred embodiment, a visible part of the scene, which will depend on the current direction of view of the viewer or user of a game application, is rendered with colors, lighting and texture information disabled, generating only z-buffer information. The stencil information is stored and processed in the following manner: from said view point, the shadow volume information computed from the light's position are rendered two times: the first time incrementing the values in the stencil buffer for each visible pixel, according to said z-buffer information, of said shadow volumes; the second time decrementing the values in the stencil buffer for each visible pixel, according to said z-buffer information, of said shadow volumes. In this simple manner a reliable information about the shadows in the 3D scene has been generated.

In a final step of the shadow rendering process, according to the present invention, said visible part of the scene is rendered with colors, lighting and texture information enabled, using a texture coordinate generation known from the prior art for casting soft shadows information stored in the cubemap over the scene while performing a stencil test operation, which is based on the stencil buffer information generated previously and is as follows: If the stencil buffer value corresponding to a pixel to be rendered indicates that the pixel lies within a shadow volume, i.e. in case that the corresponding stencil buffer value is not equal to zero, then the pixel is simply rejected, leaving the background color visible, which corresponds to full shadow intensity. In that case it is not necessary to apply the more complicated texture, color and lighting information to that pixel, which helps to save computing time.

If on the other hand the stencil buffer value corresponding to a pixel to be rendered indicates that the pixel is not within a shadow volume, i.e. in case that the corresponding stencil buffer value is equal to zero, then the pixel is rendered with textures, color and lighting information for the corresponding element.

In the soft shadow regions contained in the cubemap a transition is performed between these two extreme cases gradually. Thus, according to the invention, soft shadows information can be computed at high speed. Of course, according to the present invention the brightness/darkness may be given by either color information or alpha-values.

According to a preferred embodiment, the step of rendering a representation of soft shadows into said at least one face of said cubemap comprises a step of interpolating color or alpha values between vertex color or alpha values of said soft shadow edges and vertex color or alpha values of said edges casting shadows. An advantage is that such an interpolation may also be performed at high speed by dedicated software and/or hardware components. A further advantage is that the soft shadow representations may be encoded in a compact form before being rendered into a cubemap.

According to another preferred embodiment the step of computing soft edges comprises: for each edge casting shadows creating an additional polygon formed by four vertices and setting two vertices of said additional polygon to a respective endpoint of said edge casting shadows, the color or alpha value of each of said two vertices being set to full ambient darkness; computing, from said two vertices set to full ambient darkness, two remaining vertices at a predetermined distance from said two vertices set to full ambient darkness; and setting the color or alpha value of each said remaining two vertices being set to full ambient brightness. Thus, the soft shadow edges can be computed easily by a simple geometric displacement of polygon vertices. While the soft shadows are preferably rendered into soft shadow polygons according to this embodiment, the present invention is by no means limited to such representations. Instead any other type of geometric primitive may be used for this purpose.

According to another preferred embodiment the step of computing said two remaining vertices comprises: computing a vector given by a cross product between a normalized vector along said edge casting shadows and a normal onto a polygon surface associated to said edge casting shadows and setting the remaining two vertices of said additional polygon to points at a predetermined distance from said two vertices in a direction given by said computed vector. According to this embodiment, the soft shadows representation have an even more realistic appearance.

According to another preferred embodiment the position of the remaining two vertices is further modified by computing interpolated vectors by respectively interpolating said computed vector with another vector correspondingly computed for an adjacent edge casting shadows and the remaining two vertices of said additional polygon are respectively set to points at a predetermined distance from said two vertices in a direction given by said interpolated vector. This interpolation provides an even more realistic appearance of the soft shadows representations.

According to another preferred embodiment the method further comprises the steps of determining which sides of said cubemap requires an update based information on at least one of the viewer's position in the scene, the viewer's direction of view, the viewer's field of view, the light source's position and the position of any object moving in said scene; and rendering said representation of said soft shadow edges into each side of said cubemap that has been determined requiring an update. Thus, computing time may be saved.

According to another preferred embodiment the step of rendering said shadow volume polygons into the stencil buffer comprises: clearing the stencil buffer to a nil value (0); performing a per-pixel stencil operation for increasing a value present in the stencil buffer for front facing shadow volume polygons, if the depth value of the shadow volume polygon at the pixel of interest is less than the depth value stored in the z-buffer at the pixel of interest; and for decreasing a value present in the stencil buffer for back facing shadow volume polygons, if the depth value of the shadow volume polygon at the pixel of interest is less than the depth value stored in the z-buffer at the pixel of interest.

According to another preferred embodiment the step of applying said cubemap while performing a stencil test operation comprises: performing a per-pixel test against values stored in the stencil buffer and preventing rendering a fragment of said scene at the pixel of interest if the value stored in the stencil buffer at the pixel of interest is different from the nil value; accessing said cubemap via vectors given by 3D texture coordinates, where the greatest magnitude component is used to select a face of said cubemap and the other two components are used to select a texel from said face; and performing a texture coordinate generation for specifying a texture coordinate and selecting a pixel of an appropriate cubemap face.

According to another preferred embodiment the method further comprises the steps of storing information on characteristic points of shadows cast in a first frame; performing the steps according to any of the preceding claims for a subsequent frame of an animation of said three-dimensional scene; and computing information on corresponding characteristic points of shadows cast in said subsequent frame; wherein soft shadows in said subsequent frame are only re-rendered if a difference value computed from corresponding characteristic points of the two frames exceeds a predetermined threshold. By re-using information of previous frames computing time can be saved.

According to another important aspect of the present invention there is provided a A system for rendering a three-dimensional scene comprising a plurality of three-dimensional objects formed by polygons and for rendering soft shadows in said scene: a color buffer for storing color values; a z-buffer for storing depth values; a stencil buffer for storing stencil mask information; texture memory for storing texture information; a rasterizer for converting each of the polygons into color, depth and stencil values; a first pixel engine in communication with the rasterizer and the texture memory for copying or drawing directly a portion of the color buffer into an appropriate texture representing a specific cubemap side; a second pixel engine in communication with the rasterizer, the z-buffer and the stencil buffer for receiving said polygons and performing a depth compare operation and a stencil test operation based on the result of the depth compare operation; and a third pixel engine in communication with the rasterizer, the z-buffer, the stencil buffer and the texture memory for receiving said polygons and performing a depth compare operation, a stencil test operation and a texture coordinate generation operation, based on the result from the depth compare and stencil test, for transferring into the non-shadowed areas of the frame buffer the appropriate pixels of the appropriate side of the cubemap.

According to another preferred embodiment the system further comprises an alpha buffer for rendering into the cubemap 8 bit alpha values instead of 24 bit RGB values or any other value stored in the color buffer.

Further advantages and features of the invention will become apparent with reference to the following detailed description and accompanying drawings.

BRIEF DESCRIPTION OF THE DRAWINGS

In the drawings, wherein identical reference numerals designate identical or equivalent features.

DETAILED DESCRIPTION

In the following description, numerous specific details are set forth or summarized briefly, in order to provide the reader a thorough understanding of the present invention. In other instances, specific implementation details such as circuitry for performing well known arithmetic functions have not been shown in detail in order not to unnecessarily obscure the present invention. It will appear obvious, however, to one skilled in the art that the present invention may be practiced without such specific details.

Figure 1:
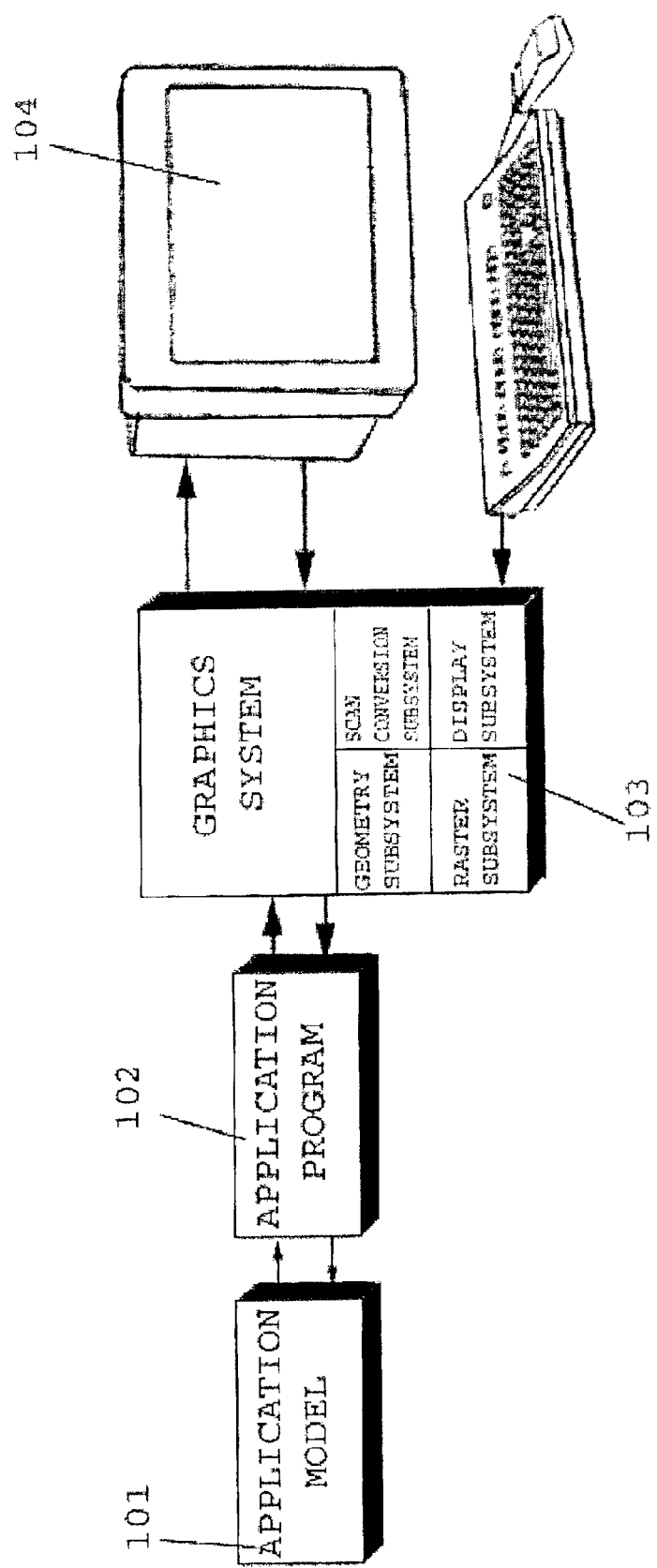
FIG. 1 is a block diagram of a graphics computer system in which the currently preferred embodiment of the present invention may be implemented.

Overview of a Computer Controlled Graphics System in the Preferred Embodiment The computer controlled graphics system of the preferred embodiment is described with reference to FIG. 1. The present invention is implemented for use on a computer controlled graphics system for generating three-dimensional images or frames of a video sequence representing a 3D scene. Its ability to support advanced real time animation makes it well-suited for games, educational applications and a host of interactive applications.

Generally, the present invention may be implemented on any computer controlled graphics system which performs z-buffering for hidden surface removal, perspective correct texture mapping and stenciling operations. Such a system could be a general purpose computer system comprising a video card as commercially available, a game or video console like PLAYSTATION® or X-BOX®. The invention is, however, not limited to such specific applications.

The graphics system supports real time image rendering and generation for both graphics and video processing. Due to the novel architecture and image processing techniques employed in the system, it can produce sophisticated real time 3-D animation at a significant cost savings over present graphics systems. In addition to graphics processing, the system according to the present invention may also support video processing such as video editing applications, and can also combine video and graphics. For instance, the system can be used to apply video data to graphical objects with soft shadow rendering, or conversely, can be used to add graphical objects to video data including soft shadow rendering.

The system supports a wide range of interactive applications. Its ability to support advanced real time animation makes it well-suited for games, educational applications, and a host of interactive applications. The system supports sophisticated user interfaces including 3D graphics or combined graphics and video. Improving upon the limited graphics capabilities of today's windowing environments for personal computers, the system can support improved 3D graphical user interfaces for applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

The processor of the preferred embodiment provides the graphics subsystem with the visual description of 3D objects comprised in a 3D scene to be rendered.

This visual description of the 3D-scene to be rendered may be computed, e.g. once in the beginning of the rendering job or during the rendering job, or may be received from some data storage means or communication interface, e.g. to a LAN or to the Internet, in the form of precomputed data to be used in the current rendering job.

The visual description of the scene takes the form of drawing commands and world coordinate vertex data. As is well known in the prior art, the world coordinate system is the coordinate system in which the 3D objects are described in the 3D scene. The visual description describes for each object in the 3D scene the geometric position, color, textures and surface normal vectors used for complex lighting calculations. The graphics architecture of the currently preferred embodiment of the present invention performs transformations and other graphics operations to calculate specific pixel values for each of the pixels on a display device. Object data from the processor may be processed by four pipelined subsystems before being displayed on the screen: 1) a geometry subsystem, 2) a scan conversion subsystem, 3) a raster subsystem, and 4) a display subsystem.

In any event, a computer system as may be utilized by the preferred embodiment generally comprises, at the hardware level, a set of interactive devices from which the computer receives the input from and output images to a display device.

The software generally has various components: at first the application program 102 that creates, stores and retrieves, in a random access memory (RAM) or other storage device (commonly referred to as a main memory), data from the second component, the application model 101, which represents the data or objects forming the scene to be drawn on the screen. The application program 102 also handles user input data, e.g. joystick commands, button commands. It produces a view of the scene by sending to the third component, the graphics system 103, a series of graphic output commands that contain both a detailed geometric description of what is to be viewed and the attributes describing how the object should appear. Thus, the functions of a geometry subsystem are performed.

The scan conversion subsystem then processes the geometric description of the scene producing pixel data. This pixel data is sent to the raster subsystem where a z-buffer performs hidden surfaces removal and a stencil test operation rejects pixel data before further per-pixel operations are performed. The raster subsystem also performs various blending and texturing functions on a per-pixel basis when the pixels are written to the frame buffer. Finally, the display subsystem reads the frame buffer and displays the image on a color monitor. The frame to be rendered may be based on line images.

A transformation of the scene to be rendered is performed based on user interactions or commands (e.g. joystick commands) that are input to the application program 102 that will eventually cause the application to make changes to the scene and/or to the resulting image displayed on the screen.

The graphics subsystem 103 in the currently preferred embodiment would also include a storage means, e.g. a Dynamic Random Access memory (DRAM), for storing texture maps. The graphics subsystem 103 would further include processing means for performing perspective correct texture mapping, i.e. per pixel divisions, during the rendering process and z-buffering. Such processing means may, of course, include special-purpose graphics processors and specialized graphics data storage components.

The graphics subsystem 103 according to a preferred embodiment of the present invention includes support for creating and storing in a texture map memory storage up to six squared empty textures of the same size, each one of them becoming one side of a cubemap, representing a cube centered at a light source's position. Each cube face of the cubemap represents a direction of view along a major axis X, Y or Z that are preferably aligned with the major axes in world coordinates of the scene to be rendered. The graphics subsystem 103 would further include a stencil buffer to perform stencil operations and processing elements for performing access to the cubemap. According to the present invention the cubemap comprises up to six textures to store the soft shadows cast by the respective light source in the center of the respective cubemap along the direction of each major axis with the light source as the origin of a respective coordinate system. The cubemap is accessed via vectors expressed as 3d texture coordinates.

As the details of the system architecture are not of primary concern and may be provided by the skilled when studying this application, further details of the system architecture are omitted in order not to render this application too long and unclear.

As will be explained below in more detail, according to the invention the cubemap is applied while rendering the 3D scene including the 3D objects in a single pass with colors, lighting and texture information enabled using a texture coordinate generation and performing a stencil test operation. Thus soft shadows are rendered in a novel way while simultaneously preventing the scene to be drawn in shadowed areas.

As will be apparent to a person skilled in the art, if there are various light sources present in the 3D scene to be rendered, a cubemap is created for each light source individually, the origin of each cubemap corresponding to the point of a respective light source in the 3D scene. To address the cubemaps of the individual light sources some kind of matrix addressing of the above texture map storage may be used or an intermediate buffer for storing the various cubemaps created may be provided. Appropriate measure to be taken will become apparent to the person skilled in the art when studying this application.

If the light source is not considered to be an omni directional light source or for other considerations, e.g. light sources far away from the regions of interest in the scene to be rendered, it may be possible according to the present invention to update less than all the six sides of the cubemap. This helps to save computing time.

Eventually in one or more sides of the cubemap is it possible to draw simultaneously additional graphical elements, such as haze, particles, images etc., to obtain different and interesting graphical results. Such graphical elements are in principle known from the prior art for rendering multiple reflections.

The approach, however, to render such graphical elements in a single pass together with soft shadows into a cubemap has not been anticipated before.

Any alternative implementations of the cubemap approach as set forth below would be apparent to one skilled in the art and would not cause a departure from the spirit and scope of the present invention.

In the following, the main steps of the method according to the present invention will be described in more detail with reference to FIGS. 3 to 11. A flow diagram summarizing the basic steps of the method according to present invention will be explained afterwards with reference to FIG. 2.

Edge Detection and Shadow Volume Creation in the Preferred Embodiment

In the currently preferred embodiment, the objects in the 3D scene to be rendered are described by a list of polygons and world coordinate vertex data. As is well-known in the prior art, the polygons usually are triangles. However, the invention is not limited to the use of triangles, but instead any suitable geometric primitive known from the prior art for image construction may be used instead.

By convention, polygons whose vertices appear, from a selected point of view, in a counterclockwise orientation of the ordered vertices of the projected polygon in screen coordinates, are called front-facing. It is possible to construct the surface of nearly any solid, from polygons of consistent orientation; such surface is called an orientable manifold, if is it possible to use all clockwise polygons, or all counter-clockwise polygons.

Well known from the prior art is the concept of back-facing culling, which is one of the methods of hidden-surface removal. If we consider for example an opaque sphere, wherever it is placed in respect to the observer, the observer will be able to see only the nearest hemisphere; the other hemisphere can be discarded. For each polygon that belongs to the sphere, it is possible to compute the angle between the normal of any polygon and a vector formed by the observer's position to one of the vertices of the polygon; if said angle is larger than 90 degrees, said polygon is considered a back-faced polygon and can be discarded, because we assume that the normal of all polygons are oriented towards the outside. Therefore the normals pointing towards the observer are relatives to the front part of the sphere, representing the front-facing polygons, which occlude from the view the back part of the sphere, containing the back-facing polygons.

Figure 3:
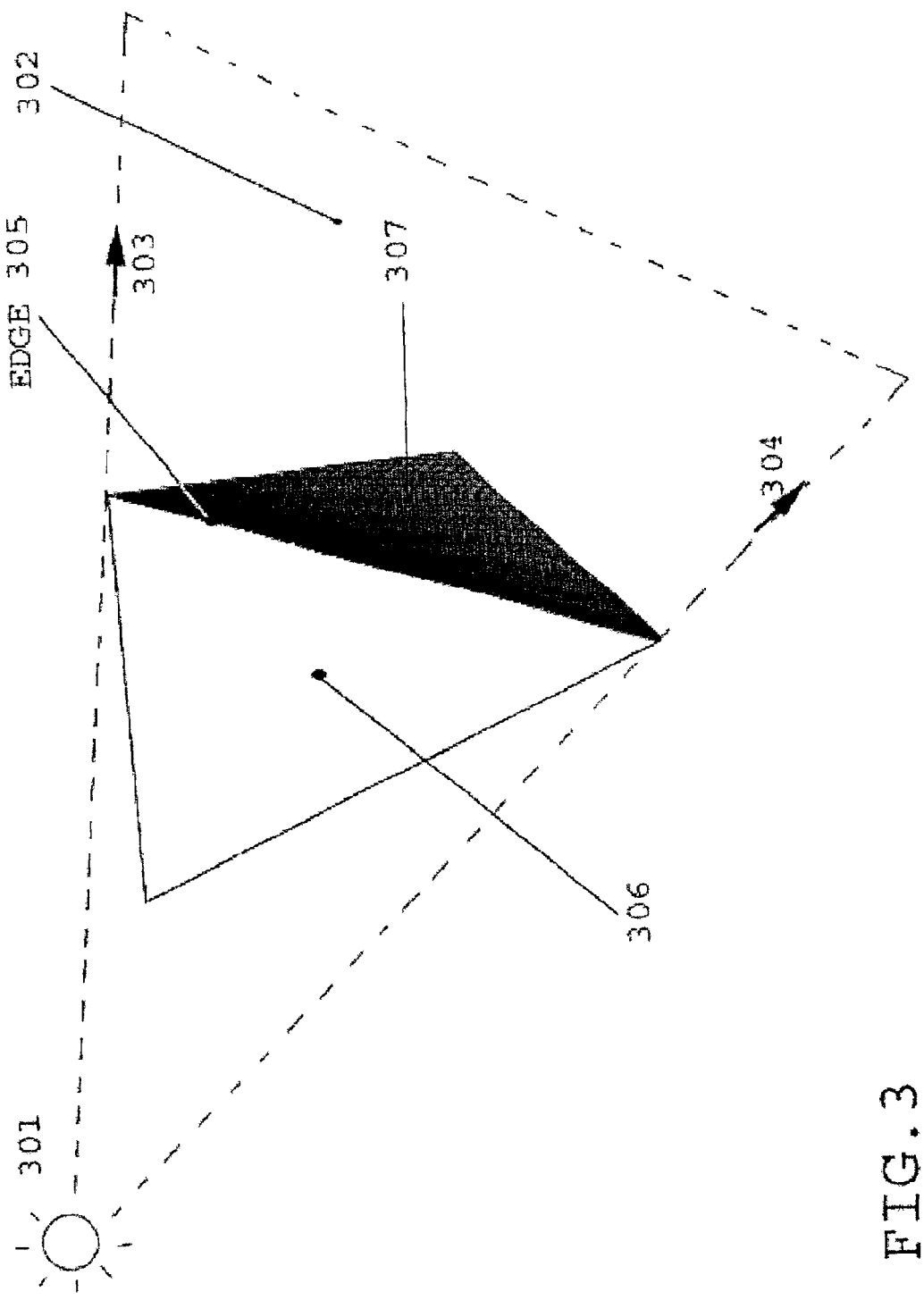
FIG. 3 illustrates determining a shadowing edge from adjacent polygons used to build up objects in a 3D-scene.

It is also known from the prior art the concept of silhouette edges: the silhouette edges are the boundaries between adjacent front-facing and back-facing polygons, as shown in FIG. 3.

FIG. 3 shows two adjacent triangles 306, 307 of the triangles together composing the 3D-scene to be rendered. In a preferred embodiment of the present invention the entire 3D-scene is composed of a plurality of adjacent polygons, e.g. triangles. As shown in FIG. 3, a triangle, which represents a preferable polygon or geometrical primitive according to the present invention, is composed by three vertices, and each vertex is connected to the other two vertices by one of the corresponding edges of the triangle; in the currently preferred embodiment, an edge can be shared by maximum two polygons. E.g. the edge 305 is shared by the two adjacent triangles 306, 307.

As shown in FIG. 3, light source 301 illuminating the triangles 306, 307 has a position in the scene corresponding to a point P described by a 3-component world coordinate vector (X1, Y1, Z1) in the 3D space of the scene to be rendered.

A polygon is considered lit by the light source 301 if it is a front-facing polygon in respect to the light's point of view, otherwise is not considered lit by the light. FIG. 3 shows two adjacent polygons 306 and 307 that share an edge 305. Any edge 305 in the scene will be considered casting shadows (hereinafter shadowing edge), if one polygon 306 of any two adjacent polygons 306, 307 that are shared by the edge 305 is lit by the light and the other polygon 307 is not lit by the light radiated from the light source 301 of interest. All the shadowing edges determined in this manner are stored in a list of shadowing edges.

As shown in FIG. 3, for each shadowing edge 305 an additional polygon 302 is calculated, by projecting the original endpoints of the shadowing edge along the direction 303 and 304 that is the extension of a line connecting the light source 301 with a common vertex of the two polygons 306, 307. The additional polygon 302 thus becomes part of the shadow volume for the scene to be rendered. The scene may comprise a plurality of such shadow volumes.

Accordingly, with the light source positions given by step S201 and the geometry data on the objects of the 3D-scene provided to the application by step S202, a list of shadowing edges, corresponding to the silhouette edges, is detected in step S203 and the shadow volumes of the 3D scene from the light source points of view are computed (step S207) and stored for later use. Below a preferred use of the shadow volumes at later stages of the method according to the present invention will be described. In order to save computing time, the shadow volumes thus computed may be used also for a subsequent frame of a video sequence to be generated without performing new computations, provided the object casting the respective shadow volume and/or the respective light source illuminating the object does not move substantially between two successive frames of the video sequence.

The determination of the object movement is performed for every object of interest in the 3D-scene and the determination of the light source movement is performed for every light source present in the scene. As is shown in the flow diagram of FIG. 2B, if it is determined that a light source has changed in position substantially between two successive frames (step S214) then the changed position of the respective light source is input to the application in step S201 and a new loop is started with the changed light position. In a similar manner, if it is determined in step S214 that the position has changed substantially in the scene then the changed position of the object is input to the application and a new loop is started with the changed object's position. Of course, the determination is performed for each light source/object of interest in the 3D-scene.

Soft Shadow Edges Creation in the Preferred Embodiment

Figure 4:
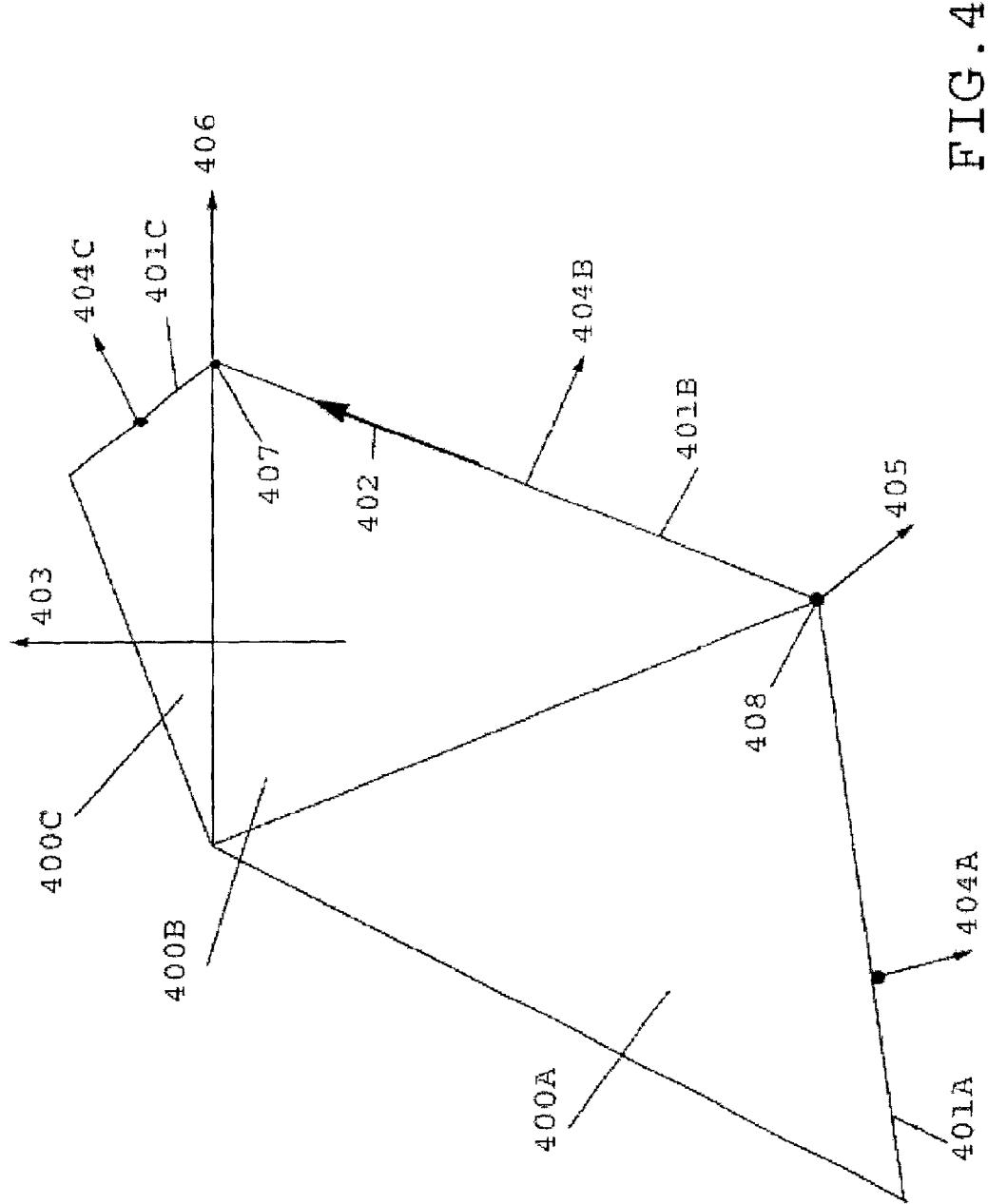
FIG. 4 illustrates steps performed for computing an additional polygon used for computing and rendering soft shadows according to the present invention.

FIG. 4 shows three adjacent polygons 400a, 400b, 400c building up the 3D-scene to be rendered. It is assumed that the edge 401B of the central polygon 400b is included in the list of possible shadowing edges as mentioned above. For each such a candidate shadowing edge 401B we calculate the cross product between the normalized vector 402 formed by the two endpoints 407, 408 of the shadowing edge 401 and the normal 403 onto the surface of the polygon 400b to which the candidate shadowing edge 401B belongs to and store the resulting normalized vector 404B. This calculation is performed for all adjacent polygons 400a–400c thus yielding the normalized vectors 404A–404C for the candidate shadowing edges. Beside this, for each endpoint 407, 408 of the candidate shadowing edge 401 we detect and create a list of all the edges connected to both vertices 407, 408.

In the current preferred embodiment, this process is performed only once since it is independent from the light source's position, and the information is stored the first time the list of polygons and world coordinate vertex data are available to the application.

This process may also be performed in advance and the results thereof stored together with the list of polygons, world coordinate vertex data and other relevant data to be communicated to the application.

Due to the possible composition of the 3D objects present in the scene, it might become necessary to adjust the vectors 404A–C found in the previous step, taking into account the list of adjacent edges casting shadows and performing an interpolation.

A preferred example is shown in FIG. 4, where we make a linear interpolation of the form: V'=(V1+V2)*0.5 (with V being an abbreviation for vector). E.g. for the central vector 404B of the central polygon 400b an interpolation is performed between the vectors 404A and 404C of two adjacent edges 401A and 401C marked as further candidate shadowing edges from the light source's point of view, thereby obtaining the new interpolation vectors 405 and 406.

Figure 5:
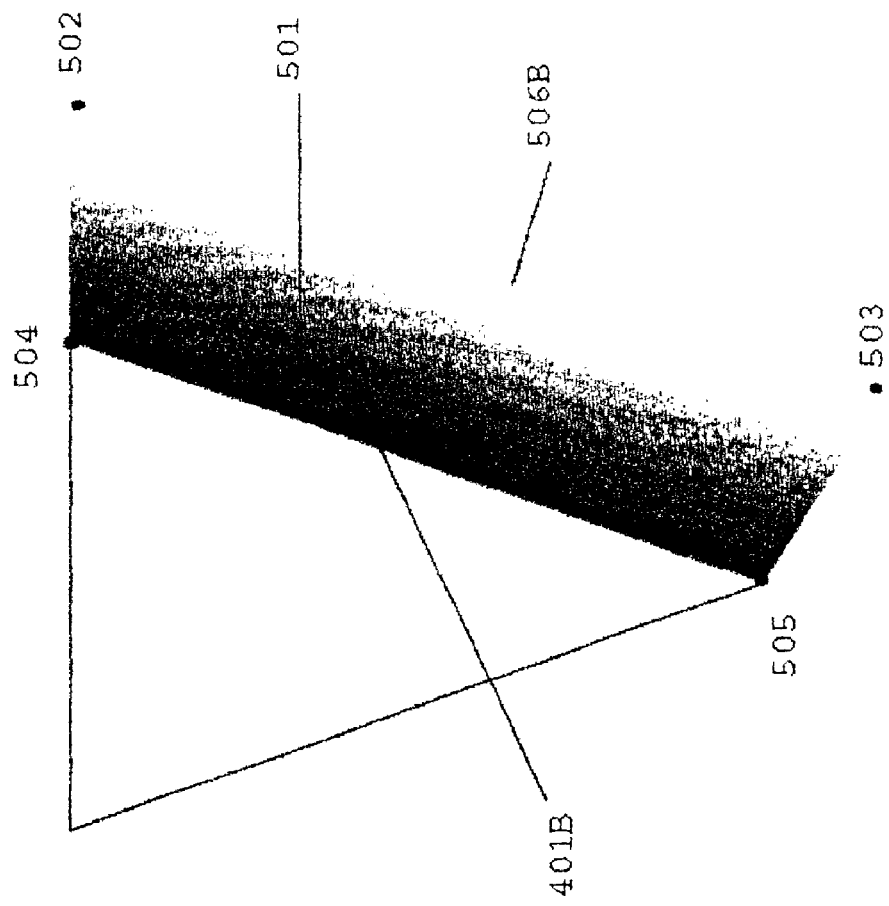
FIG. 5 illustrates a polygon used to build up objects in a 3D-scene together with an additional polygon computed according to the present invention and having a soft shadow edge shifted with respect to a shadowing edge of the polygon, said additional polygon being used for soft shadow rendering.

FIG. 5 shows how we create in the preferred embodiment, for a candidate shadowing edge 401B of the central polygon 400*b* of FIG. 4, an additional polygon 501 using the vectors 405 and 406 created in the precedent step. The points 504 and 505 represent the endpoints of the candidate shadowing edge 401*b* of the central polygon 400*b* of the precedent step. According to FIG. 5, the vertices 502 and 503 of the additional polygon 501 are created by displacing the points 504 and 505 along the directions of the vectors 405 and 406 by an amount found by calculating the distance from the vertices 407 and 408 to the light source's position. The vertices 502 and 503 are the endpoints of a soft shadow edge 506B, i.e. the ultimate edge of a soft shadow polygon 501. According to the present invention the above displacement can be approximated, but may also be represented by a fixed value or may be calculated using a suitable other approach. However, such alternative implementations to calculate this value would be apparent to one skilled in the art and would not cause a departure from the spirit and scope of the present invention.

Of course, if the above interpolation is not performed, the vector 404B or the vectors 404B and one of the adjacent vectors 404A or 404C might be used instead for displacing the points 504 and 505 of the central polygon 400*b*.

Referring to FIG. 5, for the just created additional polygon 501, we set the color of the vertices 504 and 505 (representing the candidate shadowing edge) to full ambient darkness, e.g. in the current preferred embodiment to RGB values Red=0, Green=0 and Blue=0. If the graphics system uses instead a single value, which might be of advantage for memory and speed considerations, we set the alpha value of said vertices 504, 505 to Alpha=0 assuming the nil value represents full ambient darkness.

Referring to FIG. 5, for the just created additional polygon 501, we set the color of the vertices 502 and 503 (representing the soft shadow edge or the ultimate edge of the soft shadow volume) to full ambient brightness, e.g. in the current preferred embodiment to RGB values Red=1, Green=1 and Blue=1. If the graphics system uses instead a single value, which might be of advantage for memory and speed considerations, we set the color of said vertices to Alpha=1 assuming the maximum value of one (1) representing full ambient brightness. Other encoding schemes for the color or alpha value may, of course, be implemented as well.

The above steps are repeated for each candidate shadowing edge of the polygons composing the 3D-scene. The above mentioned color value selection for the vertices of the additional polygon 501 will create, once according to the present invention the additional polygon 501 is drawn into one or more sides of a cubemap, a very smooth soft shadow edge. For a fast rendering of the soft shadows the soft shadows are rendered into the cubemap by interpolating the above color or alpha values between the respective shadowing edge and the associated soft shadow edge. Such an interpolation may be achieved by hardware and/or software approaches as will become to the person skilled in this field when studying this description. The interpolation may be performed linearly, according to some dedicated algorithm or filter function, as will become apparent to the person skilled in the art when studying this application.

Soft Shadow Edges Rendering into One or More Sides of a Cubemap in the Preferred Embodiment As a next step (S204), we create up to six squared empty textures of the same size, each one of them becoming one side of a so-called cubemap, representing a cube centered at the light source's position, and each cube face being aligned with a respective of six orthogonal major axes with the light source's position as origin. To this end, the above term 'empty' corresponds to the RGB color values set equal to unity or to an alpha value of unity, depending on the color encoding scheme applied. In more general terms the term 'empty' means that the texture of the cubemap is set to full ambient brightness. The cubemap contains image data representing the scene surrounding an object, as if the object were in the center of a cube; each face of the cubemap covers a 90 degrees field of view in the horizontal and vertical direction.

The size of the cube map texture should be chosen considering the amount of texture memory available and the desired quality; generally a higher resolution texture will give better quality and more accurate results, but it will generally consume more texture memory and computing time. Additionally, as mentioned above, the system may support the use of a grayscale alpha texture instead of a RGB texture for each cube map side, so that a convenient tradeoff for different implementations can be chosen between texture size and image quality; such alternative implementations would be apparent to one skilled in the art and would not cause a departure from the spirit and scope of the present invention.

Figure 10:
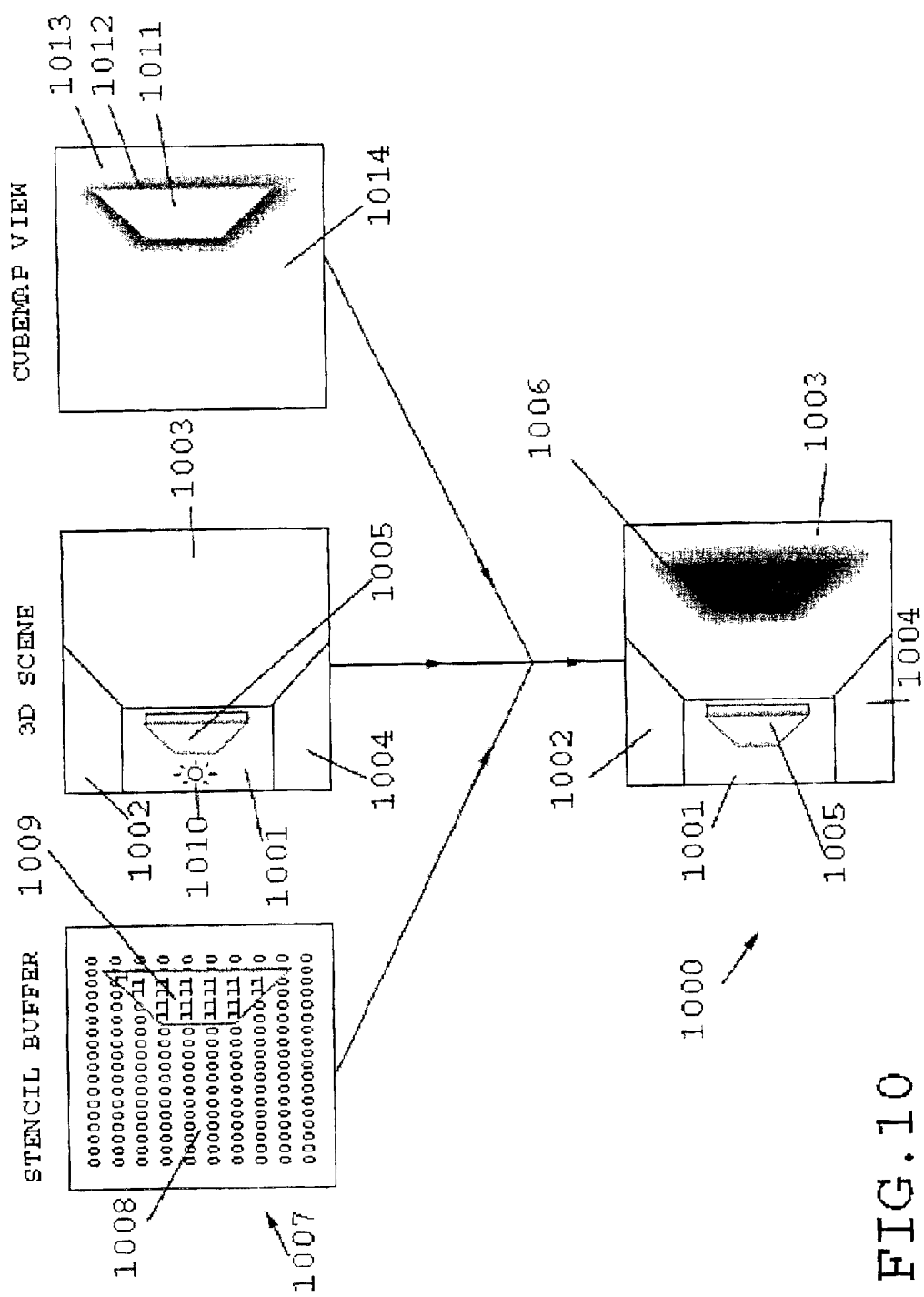
FIG. 10 rendering a 3D-scene in a single pass according to the present invention, with lighting, colors and textures enabled and applying the cubemap including the soft shadows representation while performing a stencil buffer test.

In the cubemap mentioned before, we now point a camera position to the light's point of view, set up a 90 degrees field of view, point the camera along +X, and render, from the light source's point of view, the scene with full ambient brightness or corresponding alpha value into the first face of the cubemap. Said operation will create a full brightness color texture for this side of the cubemap. At the same time we will store in the z-buffer depth-values for said part of the scene drawn in the cubemap. The purpose of storing z-buffer values is to remove hidden soft edges polygons we're going to draw in the next step, as shown in FIG. 10; depth buffer values are not used for shadow creation.

We render now from the same position and view direction and into the same face of the cubemap the list of soft shadow edges created before: the graphics system 103 in the preferred embodiment will interpolate the vertex color or alpha values across the surface of the above additional polygons between the color or alpha values of the shadowing edge and the color or alpha values of the soft shadow edge of the soft shadow polygon, thereby creating the soft shadow polygons representing the soft shadows according to the present invention into the respective face of the cubemap. Thus the step S205 (FIG. 2) is completed.

Figure 6:
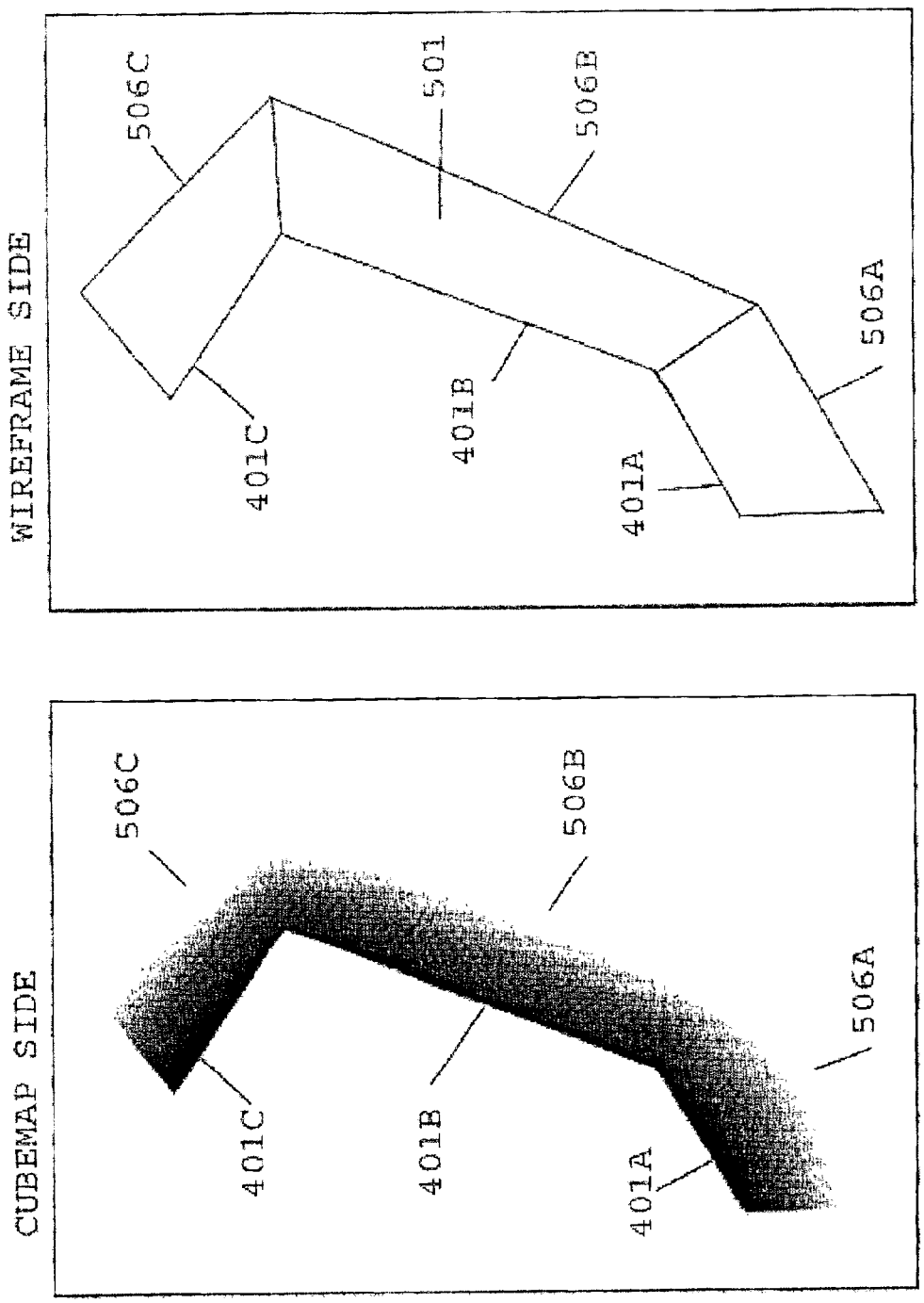
FIG. 6 illustrates the soft shadow edges representation according to the present invention rendered into one side of a cubemap and a corresponding wired frame view indicating edges casting shadows and soft shadow edges present in the side of the cubemap.

FIG. 6 shows on the left-hand part the resulting soft shadows representation in a respective face of the cubemap. Here, we assume the geometry of FIG. 4 with three adjacent polygons with adjacent shadowing edges 401A, 401B and 401C. For each shadowing edge a corresponding soft shadow edge 506A, 506B and 506C is computed as explained above. As indicated by the shadowed textures in FIG. 6, in the cubemap the color or alpha values are interpolated between those of the shadowing edge and those of the soft shadow edge for each soft shadow polygon.

For a comparison, the right-hand part of FIG. 6 shows the corresponding shadowing edges 401A to 401C and the corresponding soft shadow edges 506A to 506C in a conventional wireframe view, i.e. without the soft shadow texture. Reference numeral 501 indicates, as an example, the above additional polygon of the central polygon 400*b* (FIG. 4).

For a more sophisticated rendering of soft shadows, the following blending operation described with reference to FIG. 7 may be performed in addition according to another preferred embodiment according to the present invention.

Figure 7:
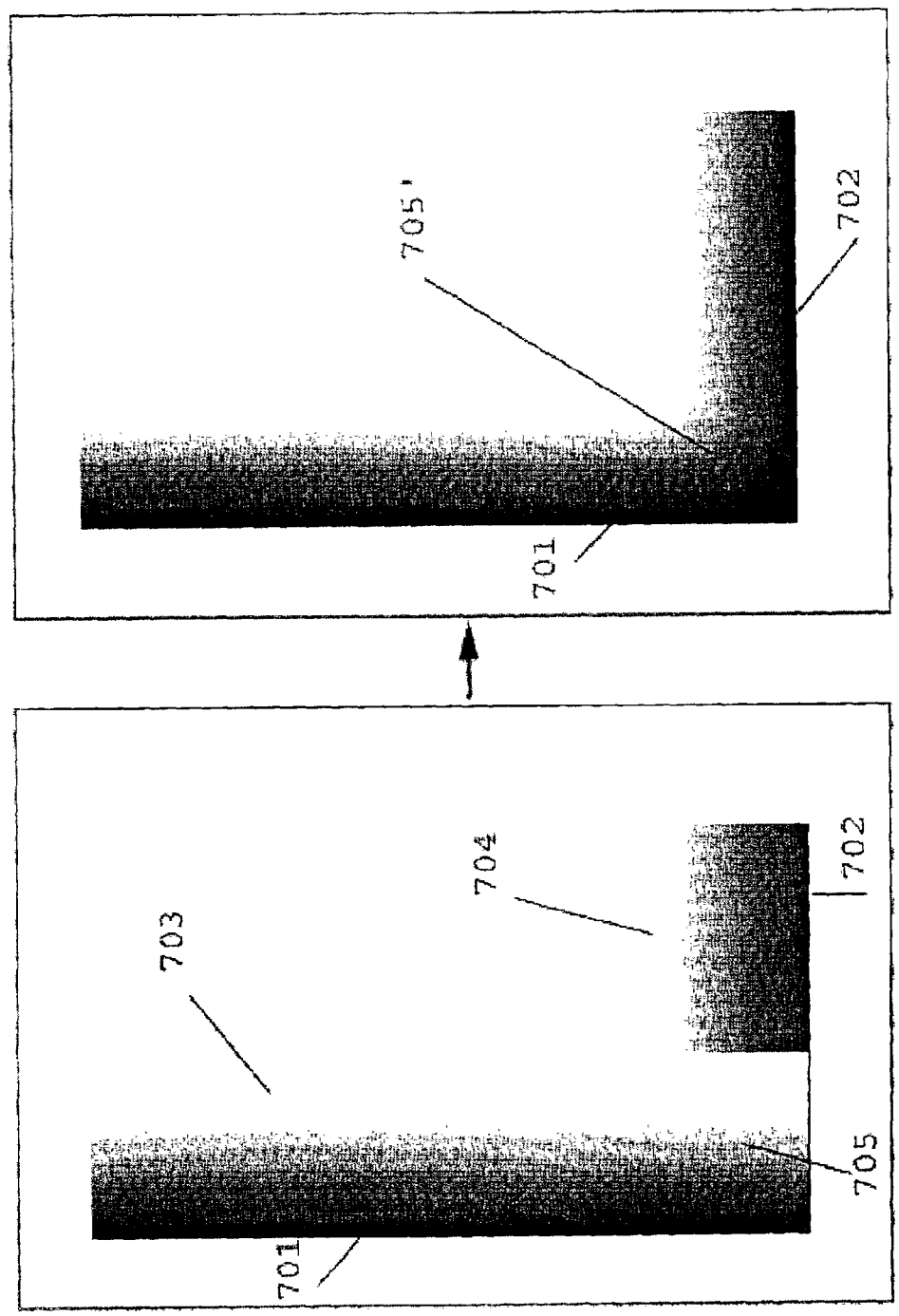
FIG. 7 a step of interpolating between two overlapping polygon edges for rendering soft shadows according to another embodiment according to the present invention.

The left-hand part of FIG. 7 shows two overlapping soft shadow polygons created in the preceding step. A first vertically extending soft shadow polygon has a shadowing edge 701 and a soft shadow edge 703 while a second horizontally extending soft shadow polygon has a shadowing edge 702 and a soft shadow edge 704. At 705 the soft shadow polygons approach each other and overlap. This overlap may be determined with the vertices of the soft shadow polygons created in the preceding step, but may, in principle, of course be determined also from the soft shadow color or alpha values directly interpolated across the soft shadow polygons.

As can be seen in the left-hand part of FIG. 7, at the bottom of the overlap area the soft shadow edge 703 of the vertical soft shadow polygon of full ambient darkness coincides with a shadowing edge 702 of the horizontal soft shadow polygon, which would cause confusion to a viewer's eye. In the same way, the extension of the soft shadow edge 704 (of full ambient brightness) of the horizontal soft shadow polygon impinges on the shadowing edge 701 (of full ambient darkness) of the vertical soft shadow polygon.

The graphical system in the other preferred embodiment will also render the soft shadow polygons by performing additionally a blending operation on a per-pixel basis. This blending operation is performed in the case of two or more adjacent soft shadow polygons overlapping with each other, as indicated in the right-hand part of FIG. 7. In the blending operation, the new color or alpha value from the subsequently computed overlapping soft shadow polygon (e.g. the horizonal polygon) is added to the pixel color or alpha value of a soft shadow polygon already stored in the respective face of the cubemap (e.g. the vertical polygon) in the overlap area 705 determined above.

The bold arrow in FIG. 7 indicates this blending operation. As can be seen in the right-hand part of FIG. 7, a modified overlap area 705' is thus created, where the color or alpha values of the overlapping soft shadow edges 703, 704 and of the overlapping shadowing edges 701, 702 are smoothly interpolated. The resulting soft shadow representation appears more natural for human visual perception.

Figure 2A:
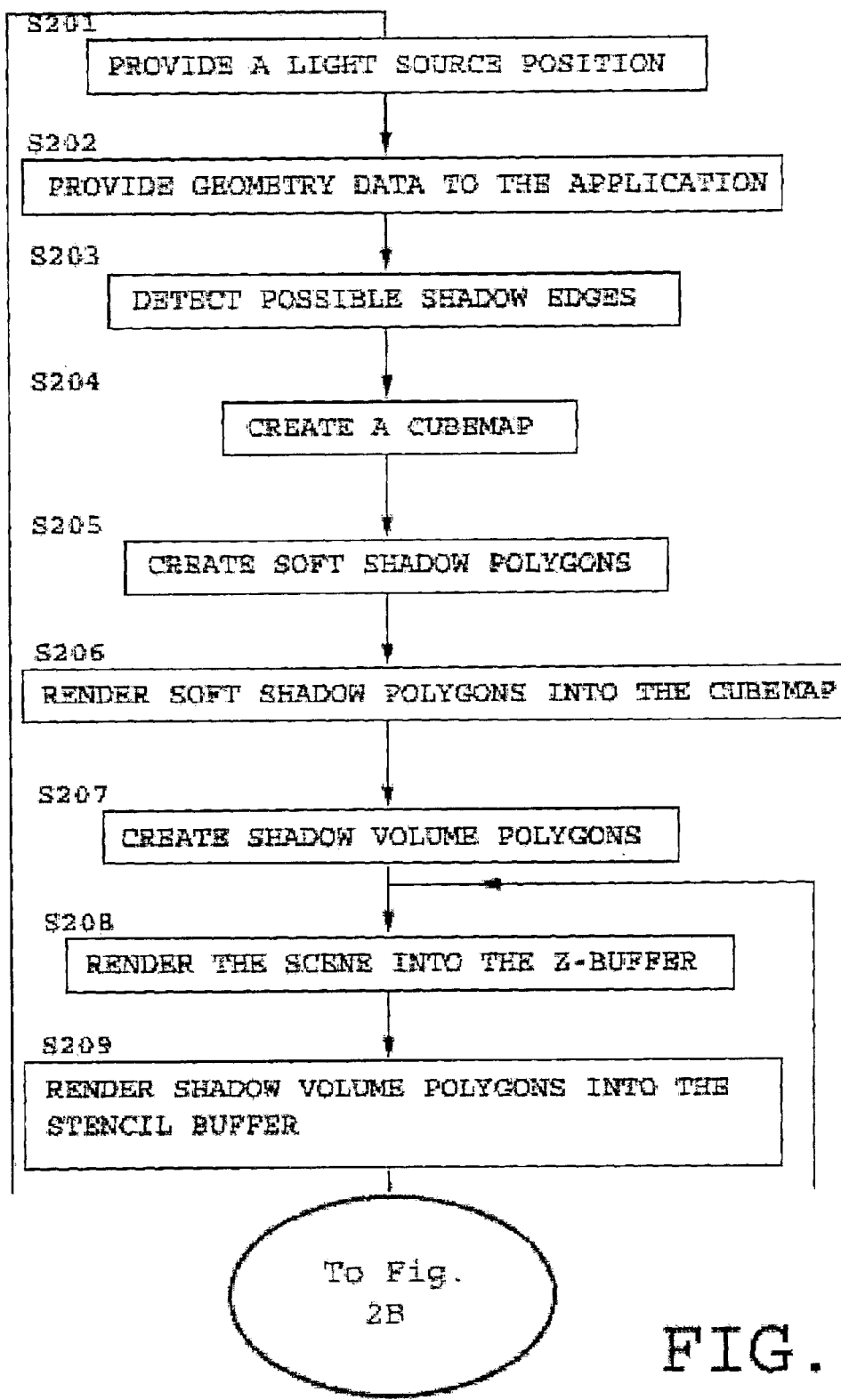
FIG. 2A, B is a flow diagram illustrating the basic steps performed by the method according to the present invention.

The above process of rendering soft shadow polygons into the cubemap will be repeated for all those sides of the cubemap that need to be updated (as determined e.g. in step S214; FIG. 2) to thereby render soft shadow polygons into these faces of the cubemap. As the first face being updated was, in the convention above, the X-face of the cubemap, this process is preferably carried out in the following order: X→+Y→-Y+Z→-Z. It will become obvious to one skilled in the art, that only a subset of the scene and of the polygonal shadow edges needs to be rendered in each different face of the cubemap, depending on the direction the cubemap face is facing to, so that various measures for reducing the number of objects to be drawn for each cubemap face can be performed, depending on the nature of the geometrical data present in the scene.

The appropriate part of the scene and the appropriate part of the list of polygonal edges can be rendered first in the frame buffer and then copied into the corresponding texture representing the face of the cube map or can be drawn directly into the texture representing the face of the cube map; such alternative implementations would be apparent to one skilled in the art and would not cause a departure from the spirit and scope of the present invention.

Thus, according to a preferred embodiment of the present invention, the cubemap itself does not contain depth information, which is stored instead in the conventional z-buffer. Further, for creating the soft shadows representation in the cubemap, no textures are used. Instead only a suitable interpolation across the soft shadow polygons is performed between the color or alpha values of the shadowing edges and the soft shadow edges. The soft shadows in the cubemap thus represent a proper umbra-penumbra area.

In the preferred embodiment, once the textures of the cubemap are created, they can be reused by successive operations, e.g. for the rendering of a subsequent frame of a sequence of frames to be generated provided the objects and light source do not move substantially between the two successive frames. Further, if the viewer of the scene to be rendered only changes the direction of view the cubemap itself needs no update as the cubemap in a preferred embodiment comprises soft shadow representation along all major axes, with the respective light source being positioned in the center of a respective cubemap. Instead, the cubemap is only accessed differently, i.e. by a vector representing another direction of view, and the shadows are rendered into the scene under a different viewing angle, which clearly saves computing time. Further details will be explained below.

Shadow Volumes Rendering in the Stencil Buffer

As a next step, and from now on, we switch to the viewer's point of view and we render the visible part of the scene in the z-buffer with colors, lighting and texture information disabled (FIG. 2, S208), in order to create the z-buffer information, necessary for rendering the shadow volume polygons created before (FIG. 2, S207) and for performing a stencil test operation (FIG. 2, S210) based on the values stored in the z-buffer in order to modify the values stored in the stencil buffer. As shown in FIG. 2, after rendering the scene into the z-buffer (S208) and rendering shadow volume polygons in the stencil buffer (S209) the stencil test operation is performed (S210).

As mentioned above, the stencil test operation is preferably performed in the raster subsystem of the graphics system 103. 3D chips supporting hardware stenciling are commercially available, e.g. the Permedia II from 3D labs or the RIVA TNT from NVIDIA, which supports a full 8-bit stencil buffer. The stencil buffer is similar to the depth buffer (z-buffer) in that the stencil buffer is a set of non-displayable bit-planes in addition to the color buffers. In the same way a depth buffer associates a depth value with every pixel for a window supporting a depth buffer, a stencil buffer associates a stencil value with every pixel for a window supporting a stencil buffer. According to the present invention, a stencil buffer of preferably eight bits may be used in a preferred embodiment of the present invention. The reason is the following: In previous years, memory capacities, memory cost, and bandwidth limitations meant that PC graphics subsystems settled for 16-bit color buffers and 16-bit depth buffers. Cheaper and denser memories and smarter designs now permit current and future generations of PC graphics subsystem to support deeper frame buffers that support two 32-bit words per pixel. Such a '3D true color' frame buffer stores 8 bits of red, green, blue, and alpha in one of the pixel words. While 16-bit depth buffers often lack sufficient depth precision, 32-bit depth buffers end up with far more precision than applications typically ever require. So instead of a 32-bit depth buffer, 8 bits of the word are better utilized as stencil buffer, leaving a 24-bit depth buffer with still generous depth buffer resolution.

The stencil value itself is an unsigned integer and, as will be described later, increment, decrement, comparison, and bit-masking operations can be performed on the integer values held in the stencil buffer. Recently, also software routines for creating and manipulating the stencil buffer, including the stencil test operation set forth below, have become available, e.g. the OpenGL Utility Toolkit (GLUT). Details of the stencil and stencil test operations are given in

[16], the content of which is hereby explicitly incorporated by cross-reference.

The approach to generate shadows using shadow volumes and stencil buffer is known from the prior art [8, 9, 10, 11, 12, 13, 14, 16]. In the current embodiment, before rendering the shadow volumes into the stencil buffer, the stencil buffer is cleared to a nil value (0). The stencil test can be either enabled or disabled, and the result of the test determines if the rasterized fragment is discarded, leaving the background color visible, i.e. full darkness, or is further processed, applying texture and other information. When enabled, the stencil test is performed for each and every rasterized fragment, so the stencil test is referred to as a per-pixel text operation. The stencil test compares the pixel stencil's buffer value to a stencil reference value that is part of the rendering pipeline state.

In the preferred embodiment, before the comparison is made, on both the stencil buffer value and the reference value a bitwise AND operation is performed with a stencil comparison bit-mask. So the stencil test has three distinct side effects depending on whether:

the stencil test fails (case 1);

the stencil test passes but the depth test fails (case 2); or the stencil test passes and the depth test passes (or the depth test is not enabled) (case 3).

The depth test simply consists in a comparison between the depth values already stored into the z-buffer and the new depth values from the incoming fragment to be rasterized, taking into account a depth test function. The depth test function is provided by the application program, and can be one of the following:

Less or Equal (case 1);

Less (case 2);

Equal (case 3);

Greater or Equal (case 4);

Greater (case 5);

For example, if the depth test function is Less or Equal (case 1), the depth test will be considered successful (the depth test passes) if the new depth value from the incoming fragment is less or equal than the value already stored in the z-buffer at that pixel of interest; otherwise the depth test fails.

In the preferred embodiment, there are not only three different per-fragment side-effects, but it is also possible to specify the operation of each of the three side effects. There are six standard stencil operations:

keep, which leaves the pixel's stencil value unchanged;

replace, which replaces the pixel's stencil value with the current reference stencil value;

zero, which clears the pixel's stencil value (sets it to a nil value);

increment, which adds one to the pixel's stencil value and clamps the result to the stencil buffer's maximum value;

decrement, which subtracts one from the pixel's stencil value and clamps the result to zero invert, which inverts the bits of the pixel's stencil value.

When a pixel's updated stencil value is written back to the stencil buffer, the stencil write bit-mask is applied so that only bits set in the stencil mask are modified. In the currently preferred embodiment, the stencil mask is always set to the hexadecimal value 0xff, so that all the stencil bits are always modified by the current stencil operation.

In the real world, the shadow casted by an object blocking light emitted by a light source is a volume. In [8] there was proposed a class of algorithms that models shadow regions as volumes. These algorithms typically comprise two stages. The first stage computes the shadow volume polygons formed by a light source and a set of shadowing objects, as explained in the section "Edge detection and shadow volume creation" in the present document. The second stage then determines whether or not a point on a surface is illuminated by the light source or is instead shadowed due to one or more of the shadowing objects. This determination is based on whether or not the point on the surface is inside or outside the shadow volume. If the point is outside the shadow volume, the point on the surface is illuminated by the light source, but if the point is inside the shadow volume, the point is not illuminated by the light source and so is considered shadowed. Given a polygonal boundary representation for the shadow volume, the stencil buffer can be used to determine whether surface pixels are inside or outside of the shadow volume.

The first step (S208) clears the z-buffer and then renders the scene with colors, textures and lighting information disabled. The purpose of this first step is to initialize the z-buffer with the depth of every pixel's nearest fragment. These nearest fragments correspond to the visible surfaces in the scene. The second step (S210) is to determine for each and every pixel in the frame buffer using stencil testing whether the visible fragment (that is, the closest fragment at each pixel as determined by depth buffering in the first step S208) is either inside or outside the shadow volume. We accomplish this by rendering the polygonal boundary representation of the shadow volumes into the scene (FIG. 2, S209).

As an example, which will be discussed below with reference to FIG. 8, we consider a simple case with non-intersecting shadow volumes, a stencil buffer whose entries values are composed by 1 bit, i.e. the value can be either 1 or 0, with the invert stencil operation used for flipping the stencil buffer bits. While rendering the shadow volume's polygonal boundary representation (FIG. 2, S209), we setup the stencil operation to invert the value present in the stencil buffer if both the stencil and depth test passes (case 3 above). The idea is that whenever a rendered fragment is closer than the depth of the visible fragment at a given pixel (that is, the pixel's depth value determined by the first step), we invert a bit in the stencil value for that pixel, but do not change the values stored in the z-buffer. During this step, we render both front-facing and back-facing polygons, as seen from the viewer's point of view.

Figure 8:
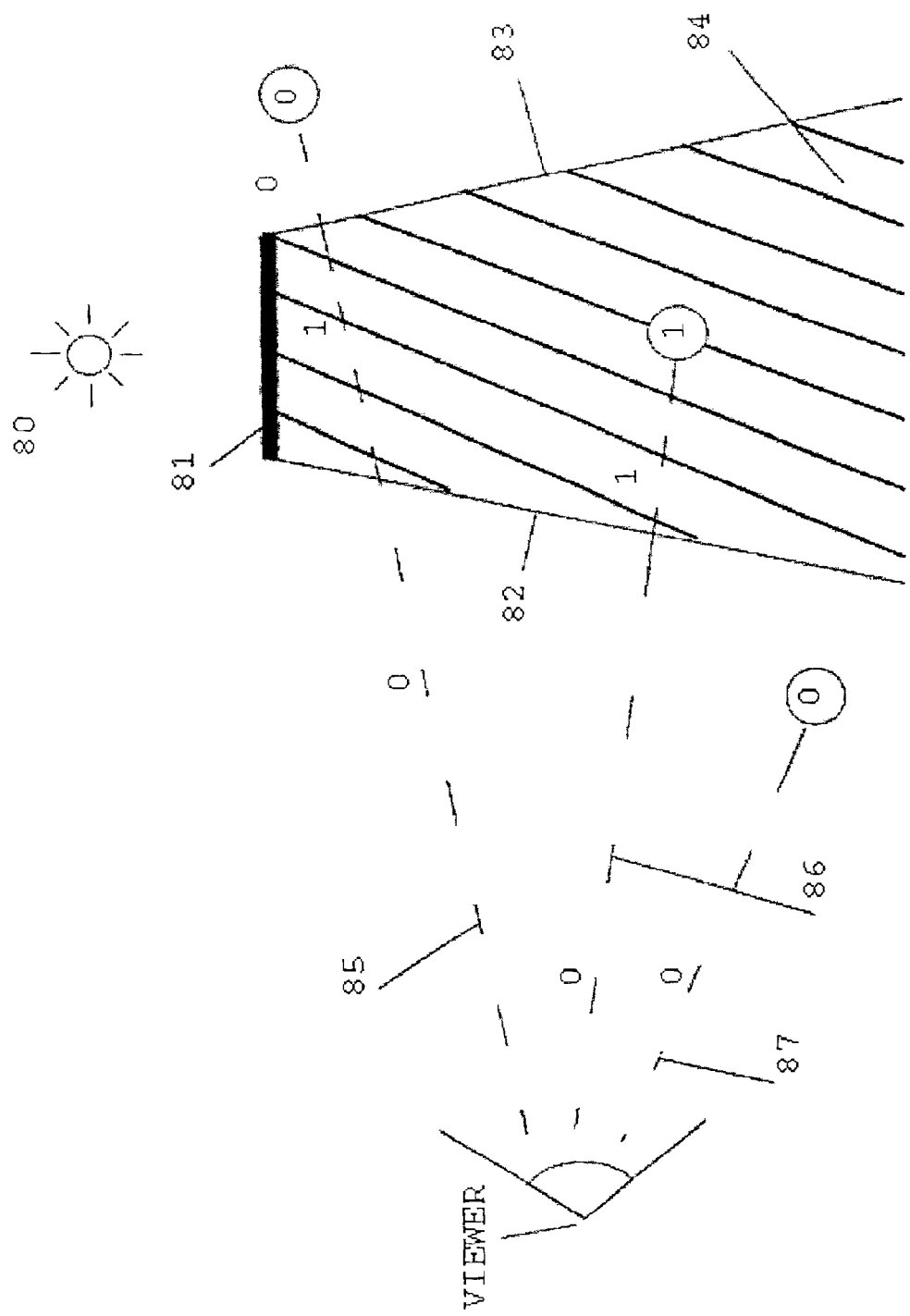
FIG. 8 illustrates the stencil invert operation while rendering shadow volumes into a stencil buffer.

FIG. 8 schematically shows a simple 3D-scene corresponding to this situation. As shown in FIG. 8, the light source 80, which usually is an omni-directional light source, illuminates the object 81, which occludes the light source 80 in a portion of the scene, namely in the shadow volume 83, which is a three-dimensional polygon. In the planar projection shown in FIG. 8, however, the planar shadow volume polygon 84 is limited by the side edges 82 and 83. As shown in FIG. 8, a viewer views the scene from the left-hand part of the shadow volume polygon 84.

For every pixel in the scene the depth information is already stored in the z-buffer (S208), as explained above. With the (three-dimensional) shadow volume polygon 84 given it can now be determined whether a pixel is within the shadow volume polygon 84 or outside. As indicated by the dashed lines 85–87, this comparison operation will associate to the pixels outside of the shadow volume polygon 84 a nil (0) value in the stencil buffer and to the pixels within the shadow volume polygon 84 a value different from the nil (0) value, in this example an integer 1, as indicated in FIG. 8 by the encircled 0's and 1's. Thus the pixels along the three viewing directions 85–87 in front of and behind the shadow volume polygon 84 will have a 0 in the stencil buffer whereas the pixels along the three viewing directions 85–87 lying within the shadow volume polygon 84 will have an integer value different from 0, e.g. 1, in the stencil buffer. Thus the stencil buffer is a simple but reliable representation indicating whether a pixel or fragment of a 3D-scene lies within a shadow volume, in which case it is sufficient to render the corresponding pixel or fragment with full ambient darkness and corresponding color or alpha value, or whether a pixel or fragment of a 3D-scene lies outside a shadow volume, in which case the corresponding pixel or fragment is to be rendered with full ambient brightness and corresponding color or alpha value.

Thus, assuming that the viewer location is outside the shadows, as shown in FIG. 8, once the second step S210 is completed, the stencil bit for each pixel is 1 if the pixel lies inside the shadow volume, otherwise it is 0.

The stencil buffer value thus indicates whether the corresponding pixel is inside or outside of a shadow volume polygon. Given that for a pixel representing an object moving in the scene it is known whether the pixel is inside or outside the shadow volume polygon 84. As each time the pixel corresponding to the object, when moving, crosses a shadow volume boundary 82, 83 simply by counting how many times the stencil buffer bit is flipped will unambiguously indicate whether the pixel is inside or outside of the shadow volume polygon 84. If the stencil buffer has more bits available, the stencil value may not be flipped but instead incremented or decremented. Thus, by determining whether the corresponding stencil buffer bit is odd or even it becomes possible to determine whether the pixel is lit by light or not.

Thus, since we are just determining evenness or oddness of the stencil buffer bits in this case, according to the present invention a single bit of stencil is in principle sufficient to determine if we are inside or outside the shadow volume. This reduces the hardware and software requirements for performing the method according to the present invention.

Also during step S211 we perform the depth test to update the frame buffer only with fragments with depth values matching the depth values from the step S208. Thus during step S208 its not necessary to store the depth values in the z-buffer.

Once the second step (S210) has tagged pixels as inside or outside the shadow volume, the third and final step (S212) re-renders the scene with textures and lighting, with stencil testing configured to update only pixels tagged as outside the shadow volume, so that pixels inside the shadow volume will not be written into the frame buffer, leaving the background color visible, i.e. full darkness.

However, in a more complex scene, the geometry and the shadow volume polygons can intersect. In such a case using a single bit in the stencil buffer and just inverting the value will yield to incorrect results.

Figure 9:
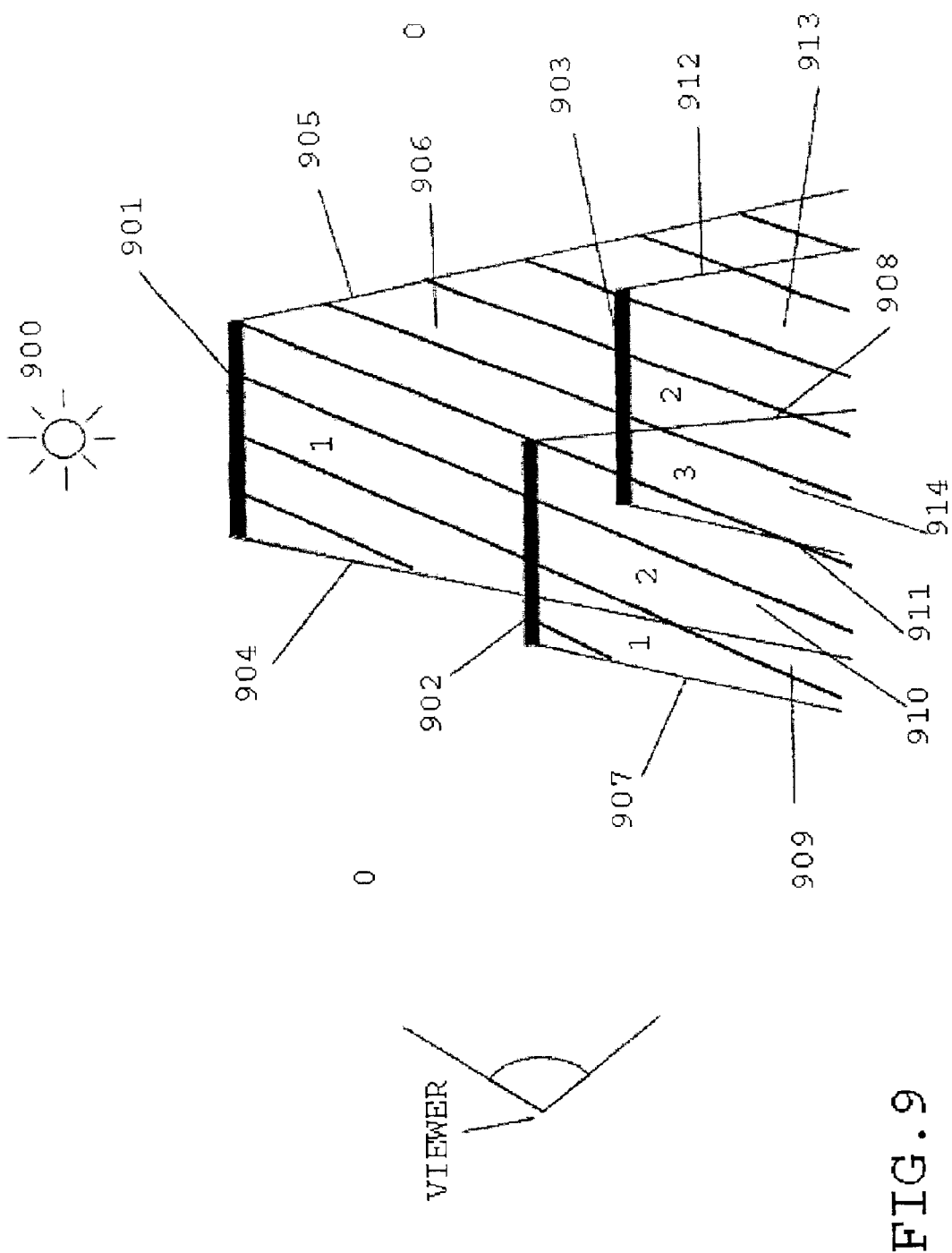
FIG. 9 illustrates the stencil increasing and decreasing operation while rendering shadow volumes into a stencil buffer.

According to another embodiment of the present invention multi-bit stencil buffers are used instead and we use the stencil increment operation increment to track shadow volume entries and the decrement stencil operation decrement to track shadow volume exits. Assuming the viewer is outside the shadow volume, if the stencil count is greater than or equal to one, a pixel is considered to be within the shadow, but if the stencil count is zero, a pixel is considered to be outside the shadow, as shown in FIG. 9. With this counting approach, the plurality of multiple intersecting shadow volumes can be handled even though the constituent shadow volumes overlap each other. This is done in two passes: in a first pass only the front facing (in respect to the viewer's point of view) shadow volume polygons are rendered while incrementing the stencil value of pixels that pass the depth test. Then, in a second pass, just the back-facing shadow volume polygon are rendered while decrementing the stencil value of pixels that pass the depth test. As viewed from the viewer's position, front-facing shadow volume polygons are "entries" into the shadow volume, while back-facing shadow volume polygons are "exits" from the shadow volume.

In order to avoid testing the shadow volume polygon orientations on the CPU, we instead render shadow volume polygons twice: first with back face culling and stencil operation set to increment, and then with front face culling and stencil operation set to decrement, from the observer's point of view, leaving the graphics system perform the backface culling operation Of course, in a more complex scene shadow volume polygons will overlap as there can be more objects in the scene potentially occluding light rays emitted by a light source. This situation is schematically shown in FIG. 9, where 900 indicates the light source and 901–903 indicated staggered occluding objects. As shown, the shadow volume polygon 906 of object 901 has boundaries 904, 905, the shadow volume polygon 909 of object 902 has boundaries 907, 908 and the shadow volume polygon 913 of object 903 has boundaries 911, 912. The shadow volume polygons overlap partially, e.g. in the regions 909 and 906 the shadow is only cast by one occluding object, in the regions 910 and 913 the shadow is cast by two occluding objects and in the region 914 the shadow is cast by three occluding objects 901 to 903. Of course, a higher bit stencil buffer may be used to track the number of occluding objects casting the respective shadow volume. In FIG. 9, the integer numbers 1, 2 and 3 indicate how many objects cast the shadow at a respective position. Again, if the stencil buffer value is the nil (0) value this indicates that the pixel or fragment is outside a shadow volume polygon and is hence to be rendered with full ambient brightness and corresponding color or alpha value, while if the stencil buffer value is different from the nil (0) value this indicates that the pixel or fragment is inside a shadow volume polygon and is hence to be rendered with full ambient darkness and corresponding color or alpha value.

Referring to the concept of front-facing and back-facing polygons explained previously, the first time we perform a per-pixel stencil operation increasing the value present in the stencil buffer for front facing shadow volume polygons, i.e. for polygons whose vertices appear, from the observer's point of view, in a counterclockwise orientation of the ordered vertices of the projected polygon in screen coordinates, if the depth value of the shadow volume polygon at that pixel is smaller than the depth value stored in the z-buffer at that pixel; and we perform a per-pixel stencil operation decreasing the value present in the stencil buffer for back facing shadow volume polygons, i.e. for polygons whose vertices appear, from the observer's point of view, in a clockwise orientation of the ordered vertices of the projected polygon in screen coordinates, if the depth value of the shadow volume polygon at that pixel is smaller than the depth value stored in the z-buffer at that pixel.

The depth values found during this process are not stored into the z-buffer. The stencil buffer has the same resolution of the color buffer and of the z-buffer; therefore after rendering the shadow volume polygons (FIG. 2, 207) and performing the above mentioned stencil operations (S209), in the stencil buffer we have generated a binary mask; each entry of the stencil buffer corresponds to one pixel of the frame buffer, telling for each pixel if it is in a shadow or not. In the preferred embodiment, if the value in the stencil buffer is equal to zero, this means that the corresponding pixel is lit by the light source. Otherwise, i.e. if the value in the stencil buffer is not equal to zero, the corresponding pixel is considered to be in shadow. This is the stencil test operation (S210) according to the preferred embodiment of the present invention.

Rendering the Scene with the Cubemap Containing Soft Shadow Edges Applied with a Texture Coordinate Generation, while Performing a Stencil Test Operation to Prevent the Scene to be Drawn in Shadowed Areas As shown schematically in FIG. 10, in the currently preferred embodiment the scene will be drawn in a single pass (FIG. 2, step 211) with lighting, colors and textures enabled while applying the cubemap including the soft shadows representations only at locations where the values in the stencil buffer for the pixels are equal to zero (indicating that the pixel is lit by a light source) and where the depth values are equal to the values already stored in the z-buffer, thereby creating a shadowed 3D scene illuminated by a light source with soft shadow edges.

More in detail, the upper part of FIG. 10 schematically shows, from left to right, a representation of the stencil buffer 1007, the 3D-scene to be rendered in a pseudo-wireframe representation and a representation of the cubemap face 1014 of interest. The cubemap drawn in FIG. 10 is a hypothetical view of the cubemap from the viewer's position matching the scene, to provide the reader a visual help to fully understand the final concept behind the present invention.

As explained above in detail, the stencil buffer 1007 in the preferred embodiment is an integer buffer. Individual locations 1008, 1009 in the stencil buffer 1007 represent individual pixels in the 3D-scene to be rendered or fragments as rasterized by the raster subsystem of the graphics system 103 (FIG. 1). As can be seen in the middle of FIG. 10, it is assumed that the 3D-scene to be rendered is the interior of a cube-shaped room with a floor 1004, a ceiling 1002 and walls 1001 and 1003. Further, it is assumed that in front of the wall 1003 there is a rectangular object 1005 hanging in the air. An omni-directional light source 1010 is approximately in the center of the room, the object 1005 occluding at least partially the light rays emitted by the light source 1010 towards the wall 1003. Thus, the object 1005 casts a shadow onto the wall 1003. As the light source 1010 is not a point light source, the shadow cast onto the wall 1003 comprises a central shadow surrounded by the soft shadow edges where the color or alpha value of the shadow gradually changes from that of the central shadow to that of the ambient texture lit by the light source 1010.

As explained above, according to the present invention the soft shadow representation is rendered into at least one face or side of the cubemap 1014. As can be seen in the right-hand part of FIG. 10, the faces of the cubemap 1014 are filled with empty textures, e.g. rendered with full ambient brightness or corresponding color or alpha value, and only contains the relevant information on the soft shadows. As the light source 1010 is positioned in front of the occluding object 1005 and no further occluding objects are assumed in the 3D-scene to be rendered, the only shadow present in the 3D-scene will be the shadow cast by the object 1005 onto the rear wall 1003 of the room. Hence, the face of interest of the cubemap will be the face facing towards the wall 1003. Assuming that the room walls 1001 to 1004 are aligned with the major axes of the cubemap, the soft shadows representation will be present only in one face 1014 of the cubemap. Otherwise, the representation of soft shadows cast by a single light source and a single object might be present also in more than one face of the cubemap. As shown in the right-hand part of FIG. 10, the face of interest of the cubemap 1014 comprises empty textures representing the environment and the core shadow 1011, where the shadow will be rendered in the final frame with full ambient darkness, i.e. with a predetermined fixed value. Only at the edges of the shadow volume will the soft shadows exist. As shown in the cubemap 1014 the shadow texture gradually changes from full ambient darkness near the hard shadow edges 1012 to full ambient brightness near the soft shadow edges 1013.

For each pixel or rasterized fragment of the 3D-scene to be rendered, the stencil buffer 1007 stores an integer value indicating whether the corresponding pixel or rasterized fragment to be rendered is in a shadow volume or not. Accordingly, for the scene considered here the buffer locations 1009 with the 1's represent the core shadow 1011 cast by the object 1005 and indicate that the corresponding pixels or rasterized fragments are not lit by light, which means that in the step S211 (FIG. 2) of rendering the scene light, colors and textures are to be disabled for these pixels or rasterized fragments. Accordingly, these pixels are rasterized fragments are simply rendered at full ambient brightness, which does not require extensive computations and hence saves computing time.

In contrast, the buffer locations 1008 with the nil-values (0's) indicate the pixels or rasterized fragments that are lit by the light source 1010 and are therefore to be rendered with light, colors and textures enabled when the 3D-scene is finally rendered in step S211 (FIG. 2). Only for these pixels or rasterized fragments is the texture mapping coordinate generation turned on in step S211, which will be explained below in detail. As will become apparent to the person skilled in the art, this approach clearly saves computing time.

The lines connecting the stencil buffer 1007, the schematic wireframe representation of the 3D-scene to be rendered and the cubemap 1014 shown in the upper part of FIG. 10 with the final frame shown in the lower part of FIG. 10 schematically summarizes the final step S211 of rendering the 3D-scene in a single pass. Accordingly, for this single pass rendering step light, colors, textures of the texture mapping coordinate generation facility are enabled while the cubemap 1014 is applied at the same time only at locations where the values in the stencil buffer 1007 for the pixels or rasterized fragments are equal to zero (indicating that the pixel is lit by a light source), i.e. at the locations 1008 in the stencil buffer 1007, and where the depth values are equal to the values already stored in the z-buffer, thereby creating a shadowed 3D scene illuminated by a light source with soft shadow edges.

Accordingly, in the shadow volume polygons cast by the object 1005 the pixels are drawn with full ambient darkness, which usually is given by a predetermined color or alpha value. As mentioned above, at the locations of the shadow volumes 1011 the cubemap is empty because the cubemap includes only the soft shadow representations 1013. The cubemap will contain soft shadow representations substantially only at the edges of the shadow volume polygons. At these locations, by rendering the scene with light, colors and textures enabled while applying the cubemap, soft shadow information and texture information on the environment is blended. Farther remote from the shadowing edges 1012, i.e.

at locations where the cubemap is empty again as there are no soft shadow representations, only texture information on the environment will be rendered, i.e. the scene will be rendered at full ambient brightness, because at locations 1008 in the stencil buffer 1007 corresponding to these pixels or rasterized fragments, the nil (0) value indicates that the texture mapping coordinate generation facility as explained below is to be activated for rendering the 3D-scene in the final rendering step S211 (FIG. 2).

According to the invention, a texture map is addressed by S and T indexes that are components of a 3-component vector. The cubemap in use can be accessed via vectors expressed as 3D texture coordinates (S, T, R), where the greatest magnitude component S, T or R is used to select the cube face of interest and the other two vector components are used to select a texel (texture element) from that face, as shown in FIG. 11.

Figure 11:
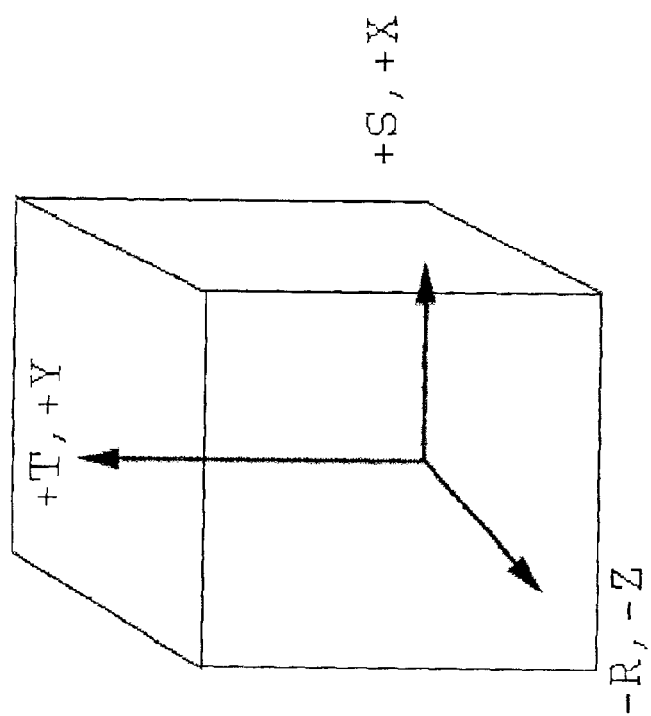
FIG. 11 illustrates the step of accessing the cubemap according to the present invention by means of a 3-component vector expressed as 3D texture coordinates (S, T, R)

In the current embodiment, the sides or faces of the cubemap are defined as follow, as shown in FIG. 11:

1. Cube side positive X (+S,+X)
2. Cube side negative X (−S,−X)
3. Cube side positive Y (+T,+Y)
4. Cube side negative Y (−T,−Y)
5. Cube side positive Z (+R,+Z)
6. Cube side negative Z (−R,−Z)

The currently preferred embodiment of the present invention utilizes a texture mapping coordinate generation facility similar to one described in detail in U.S. Pat. No. 5,805,782 the whole content of which is hereby incorporated by cross-reference for the purpose of disclosure in this application.

Texture coordinates associated with a vertex may either be taken from the current texture coordinates or generated according to a function dependent on vertex coordinates; the texture mapping generation facility utilized by the currently preferred embodiment of the present invention generates texture map coordinates based on a variably positioned source point, being the light's source position. The effect is to project the textures of the cubemap onto the scene being rendered; the cubemap contains soft shadows informations representing the scene surrounding the light source, as if the light source were in the center of a cube. The above stencil test operation will prevent the cubemap textures to be drawn in shadowed areas leaving the background color visible, i.e. fill darkness, therefore generating at the same time shadows and soft shadows representation in the scene.

When rendering realistic three-dimensional scene to a two-dimensional screen, the projection from three to two dimensions must be a perspective projection. A perspective projection requires a division operation be performed to obtain texture map coordinates. The projected vertices of the polygons that builds up the scene determine boundary edges of projected polygons. Scan conversion uses iteration to enumerate pixels on the screen that are covered by each polygon. This iteration in the plane of projection introduces a homogenous variation into the parameters (texture coordinates) that index the texture map of a projected polygon. If the homogenous variation is ignored in favor of a simpler linear iteration, incorrect images are produced that can lead to incorrect results during scene animation. Correct interpolation of texture coordinates requires each coordinate to be divided by a common denominator for each pixel of a projected texture mapped polygon; in our case, the common denominator will be, as mentioned above, the highest magnitude component, let's say T; since T is the highest magnitude component, the cube side to be used is the side n.3, with Y positive extent; each coordinate of the projected texture cube map side can be obtained by dividing the other components by T, giving S'=S/T, R'=R/T, accessing the two dimensional texture map of the selected cube side.

The texture generation facility generates texture coordinates from vertex attributes; the vertex position is used to generate the texture coordinate. The type of texture coordinate generation used in the current preferred embodiment is the object linear coordinate generation. Each component of the texture coordinate is computed by evaluating a plane equation at the vertex position.

The light position point may be variably positioned inside the scene and act as the origin for the light coordinate system. In order to readily create coordinates in the light system from vertex points of the geometric primitive, a transformation matrix is created; in the embodiment of the present invention, the light source is considered a point light source, so that it is necessary to create only a translation matrix for encoding light's source position, since a point light source has no orientation but is casting shadows in all directions. When a vertex point is received by the rendering pipeline for processing during scan conversion, the vertex coordinates in the world system are transformed into light coordinates. The light coordinates are then derived into texture map coordinates by merely dividing the linear x and y coordinates of the selected cube map face by the highest magnitude component, as described above; this effectively cause projection of the selected cube map side into the scene being rendered.

Finally, in the current preferred embodiment, when the cubemap is applied over the scene, the already smooth edges present in the cubemap will result, once drawn, in an even smoother form, if a bilinear or higher order polynomial filtering is applied to the texture of the cubemap face when drawn in the color buffer. If the graphics system has support for trilinear or anisotropic filtering, as known from the prior art, said support can be used, creating mip-mapping images for each side of the cubemap and then applying either a trilinear or anisotropic filtering, resulting in an even better quality and realism of the 3D scene being rendered. Such alternatives implementations would not cause a departure from the spirit and scope of the present invention.

Summary of the Basic Method Steps of a Preferred Embodiment

Thus, the basic method steps of the currently preferred embodiment of the present invention can be summarized as shown in FIG. 2, which is a schematic flow diagram.

Referring now to FIG. 2, first the one or more light source positions are provided to the system (S201) and the geometry data on the objects present in the 3D-scene to be rendered are provided to the system (S202). This information also includes information on the movement of the one or more light sources and of the objects present in the scene. This information may be computed internally, e.g. based on information on the scene stored on a data recording medium, or may be provided by an external device, e.g. by transmission of relevant data via a network like a LAN or the Internet. This information may, of course, take into consideration user interactions, like commands in video game or game console applications, e.g. joystick or button commands.

With the geometry data on the 3D-scene and the information on the light source's position(s) given it is then possible to detect the shadowing edges (S203) as explained with reference to FIG. 3 above and to create the soft shadow polygons (S205) as explained with reference to FIGS. 4 to 7 above. As an intermediate step, for each light source present in the scene, a cubemap of initially empty textures is created (S204). For this purpose, sufficient memory is allocated in a buffer with the storage locations being initialized with a value corresponding to an empty texture. Then the soft shadow polygons are rendered into the cubemap (S206). The cubemap thus contains a representation of the soft shadows that may be readily applied to a 3D-scene to be rendered.

The method now switches to the point of view of a viewer viewing the 3D-scene to be rendered. As a next step, the shadow volume polygons are created (S207) as explained with reference to FIG. 3 above so that 3D-information on the shadow volumes present in the scene is available. Afterwards, the whole scene is rendered into the z-buffer (S208) with colors, lighting and textures disabled in order to obtain depth information on each pixel or fragment of the 3D-scene to be rendered, which is used for performing the stencil test operation afterwards.

As a next step, stencil buffer data representing the shadow volumes are created according to the algorithms as explained above with reference to FIGS. 8 and 9 (S209). The stencil buffer thus comprises integer data indicating whether or not the corresponding pixel or fragment is lit by a light source.

As a next step the whole scene is rendered (S211) in a single pass with colors, lighting and texture information enabled and applying the cubemap to the scene using a texture coordinate generation while performing a stencil test operation for preventing the scene to be drawn in shadowed areas. This single pass step has been explained in detail above with reference to FIG. 10. In the stencil test operation (S210) it is determined, for a respective pixel or fragment of the scene to be rendered, based on the stencil buffer information created in step S209, whether the respective pixel or fragment is inside or outside a shadow volume. If the result is NO, the method proceeds with step S212, where it is determined whether all pixels or fragments of the visible scene have already been rendered.

If the result in step S210 is YES, the method proceeds with the rendering step 211. In the rendering step S211 colors, lighting and texture information is enabled for rendering the pixel or fragment as the stencil buffer information has indicated in step S210 that the respective pixel or fragment is outside a shadow volume. Finally, in step S212 it is determined, whether all pixels or fragments have been rendered. If not, the method returns to step S210 to perform a stencil text operation and a rendering step for a subsequent pixel or fragment. The graphics information on the 3D-scene to be rendered is stored in a memory component, like a frame buffer, which is used by a display device for displaying the frame.

Of course, the above method steps may be repeated for each light source present in the 3D-scene, as will become apparent to the person skilled in the art when studying this specification. Hence, although not indicated in FIG. 2 for reasons of clarity after step S212 there will be provided a step for determining whether there is an additional light source present in the scene or not. As explained above, for each light source present in the scene to be rendered there will by one cubemap containing the soft shadow representations of the scene as seen from the point of view of the respective light source, which is positioned in the center of the respective cubemap.

If the result in step S212 is YES, the method finally proceeds with step S213 to display the content of the memory component, e.g. of the frame buffer, on a conventional display device, e.g. a CRT or LCD, a TV-set, a viewer helmet for quasi-3D-projection or on a room wall by means of some projecting device. The frame to be rendered usually consists of two line images to be displayed alternately in an interleaving manner, as is known to the person skilled in this field. Conventional techniques for real stereoscopic displaying of the scene may, of course, be used according to the present invention as will be explained below in more detail. Usually, such real stereoscopic display methods are based on a selective stereoscopic manipulation of the line images as to become left-eye and right-eye views of the scene to be rendered.

Of course, there is provided a step S214 for determining any substantial changes in the scene between two subsequent frames. While in the schematic flow diagram of FIG. 2 it is indicated only that the step S214 determines whether the position of at least one light source has changed, it is apparent to the person skilled in this field that the step S214 will be more sophisticated to this end. Hence, in step S214 any information relevant to the rendering of the scene will be surveyed, with the following list merely representing some examples that are not considered as to limit the scope of the present invention. Hence it may be determined, whether the position of the light source has changed, whether a light source has been turned on/off, whether an object casting shadows has moved, whether an object casting shadow has changed in size, orientation or shadowing contour, whether the position of a viewer viewing the scene has changed etc. Of course, even if such a change is detected in step S214 the soft shadow information created for the previous frame may be re-used provided that the change is not substantial. For this purpose some criterion is used, e.g. a threshold value for any of the above exemplary changes. Hence, according to another preferred embodiment, if the amount of change detected in step S214 is smaller than the respective threshold value (YES in step S214) the soft shadow information created for the previous frame may be re-used. The method then returns to step S208 and renders a subsequent frame using the soft shadows representation of the cubemap created for the previous frame in step S206.

Thus, the method according to the present invention may react quickly if the viewer changes the direction of view quickly as the cubemap according to a preferred embodiment of the present invention contains soft shadow information of the respective objects in the scene cast into all six directions. If necessary, the method then simply accesses a different face of the cubemap.

Further, the movement of the viewer is not coupled anymore to the soft shadows representation. Namely, while the viewer moves through the scene the shadows cast by the light source(s) present in the scene will not change. Thus, according to the present invention only the depth information on the scene has to be computed for a subsequent frame (step S208) while the soft shadow representation may be re-used for rendering a subsequent frame. Clearly, this approach saves computing time.

On the other hand, if the result in step S214 is YES, the method returns back to the start of the method and changes the relevant information on the light source and/or object present in the scene to be rendered.

The shadow generation process has been described for a single light source but can, of course, be repeated for multiple light sources with optimizations possible for reducing the total number of rendering passes. Variations and modifications of our systems and methods can be implemented in hardware or software or a combination of both.

As already mentioned above, in the preferred embodiment, once the shadow volume polygons and textures of the cubemap are created, they can be reused by successive operations, e.g. for the rendering of a subsequent frame of a sequence of frames to be generated or of an animation provided the objects and light source do not move substantially between the two successive frames. One way to test the necessity of an update of the shadow volume polygons and cubemap is to evaluate how the position of a shadowing object changes from frame to frame. If the position changes more than a predefined amount (threshold), then the rendering system should re-compute the shadow volume polygons and the textures of the cubemap.

For this purpose the processor may evaluate the change in position of the shadowing object by evaluating the change in position of characteristic points in the scene from frame to frame. A person skilled in the art will become aware of a suitable position metrics for estimating the necessity of an update.

More in detail, in order to estimate the necessity of re-computing a texture of a cubemap and related data, characteristic points on a shadowing object are identified in a first frame of the animation and the locations of these characteristic points are stored. In subsequent frames the locations of these characteristic points are determined. A difference in position of the characteristic points between successive frames of the animation is then computed. Also multiple such differences may be averaged to an average value in order improve the accuracy. The difference is then compared with a predetermined threshold value (that may be varied e.g. by the viewer in accordance with his requirements).

Although not described in detail above, the method and system according to the present invention may make use of data compression techniques (for allowing smaller memory requirements and vastly reduced bandwidth requirements), suitable caching strategies, random pixel addressing (so-called chunking) and the like.

The method and system according to the present invention may also support soft shadow rendering in real stereoscopic display systems. Real stereoscopic display systems are known from the prior art. In many of these systems left-eye and right-eye images or frames of a 3D-scene are displayed alternately using some kind of technique for switching between left-eye views and right-eye views of the scene to be rendered. Examples for such systems include alternate rendering left-eye and right-eye views with different colors, like green and red shifted colors, switching the transmittance of a viewer's glasses or displays of a display helmet alternately between left-eye and right-eye views of the scene, e.g. by means of a LCD-shutter or the like. This invention is, however, by no means limited to the above specific stereoscopic display systems.

In applying the method according to the present invention as set forth above to such real stereoscopic systems the realism of soft shadow rendering in representations of 3D-scenes can be improved even further. For this purpose, existing graphics systems for controlling such stereoscopic display systems may be readily modified in accordance with the teaching of this invention as set forth above as will become apparent to the skilled person when studying this application.

As is well-known, frames to be displayed consist of individual lines. If the frames are to be displayed on a CRT or the like, the line images are alternately written onto the CRT. This technique may also be used to save computing time. Within the scope of this application it is also considered to refresh soft shadows to be displayed only every second frame or alternately for individual line images of a frame in synchronization with the alternating order of the line images.

As will be obvious to the person skilled in the art, the method according to the present invention may be readily implemented as a computer program product or software application for executing the method steps if the program is loaded into the internal memory of a suitable computing means or run by a suitable processing means of a graphics system. The software may be stored on a data carrier, like a magnetic or optical carrier, on nonvolatile memory components like EPROMS, EEPROMS and the like, but may also be downloaded in realtime or in advance from a network like a LAN or the Internet.

In view of the many possible embodiments and alternatives to which the principles of our invention may be put, we emphasize that the detailed embodiments described above are illustrative only and should not be taken as limiting the scope of our invention.

LIST OF REFERENCES AND CROSS-REFERENCES:

[1] Blinn, Jim, "Me and my (fake) shadow", IEEE Computer Graphics and Applications, vol.8, pp. 82–86, January 1988.
[3] Nguyen Hubert, "Casting shadows on volumes", Game developer, vol.6, March 1999.
[4] Steven Parker, Peter Shirley, Brian Smith, "Single Sample Soft Shadows", Technical Report UUCS-98-019, Computer Science Department, University of Utah, 1998.
[5] W. T. Reeves, D. Salesin, and R. L. Cook in "Rendering Antialiased Shadows with Depth Maps", SIGGRAPH '87 Proceedings, July 1987, 21(4), pp. 283–291
[6] L. Williams, "Casting Curved Shadows on Curved Surfaces" in Computer Graphics, August 1978, 12(3), pp. 270–274
[7] Paul Heckbert and Michael Herf, "Simulating soft shadows with graphics hardware", Technical Report CMU-CS-97-104, Carnegie Mellon University, January 1997.
[8] Franklin C. Crow, "Shadow algorithms for computer graphics", in Computer Graphics, Siggraph 1977 Proceedings, 242–248, July 1977.
[9] P. Bergeron, "A general version of Crow's shadow volumes", IEEE Interactive computer graphics and applications, 6(9): 17–28, 1986
[10] Paul j. Diefenbach and Norman Badler, Pipeline Rendering, "Interactive refractions, reflections and shadows" Displays: special issue on interactive computer graphics, 15(3):173–180,1994.
[11] Tushar Udeshi and Charles Hansen, "Towards Interactive, photo realistic rendering of indoor scenes: a hybrid approach", In Rendering Techniques '99 (Proc. of Eurographics rendering Workshop) 63–76, June 1999.
[12] "Vertex shader shadow volume", Nvidia Effect browser, Aug. 10, 2001 Copyright 1999–2001 Nvidia Corporation, www.nvidia.com
[13] Sander, Pedro V., Xianfeng Gu, Steven J. Gortler, Hugues Hoppe, and John Snyder, "Silhouette Clipping," Proceedings of SIGGRAPH 2000, pp. 327{334, July 2000. http://www.deas.harvard.edu/~pvs/research/silclip/
[14] Sim Dietrich, "Shadow Techniques", Nvidia Corporation, Technical presentation, www.nvidia.com/developer, GDC 2001 Presentation
[15] Chris Wynn and Sim Dietrich, "CubeMaps", Nvidia Corporation, Technical presentation, www.nvidia.com/developer
[16] Mark J. Kilgard, 'Improving Shadows And Reflection via the Stencil Buffer', Nvidia Corporation, Technical presentation, www.nvidia.com/developer.

What is claimed is:

1. A method for rendering soft shadows in a frame representing a three-dimensional scene, which is defined by a list of polygons and comprises a plurality of three-dimensional objects, said method comprising the steps of:

from a light source's point of view:
  determining edges casting shadows from said list of polygons;
  computing shadow volumes and computing soft shadow edges from said edges casting shadows;
  creating up to six squared empty textures of the same size, each of them becoming a face of a cubemap representing a cube centered at the light source's point of view, said faces of said cubemap being aligned with orthogonal major axes with the light source's position as origin;
  rendering into at least one face of said cubemap an appropriate part of said scene with full brightness color and rendering a representation of soft shadows into said at least one face of said cubemap using said edges casting shadows and said soft shadow edges computed;

from a point of view of a viewer viewing said scene:
  rendering a visible part of the scene into a z-buffer with colors, lighting and texture information disabled for generating depth information;
  rendering said shadow volumes into a stencil buffer in combination with said z-buffer information; and
  in a single pass, rendering said scene with colors, lighting and texture information enabled and applying said cubemap to said scene for rendering said representation of said soft shadows into said scene using a texture coordinate generation while performing a stencil test operation for preventing the scene to be drawn in shadowed areas, to produce a soft shadowed image.

2. The method according to claim 1, wherein the step of rendering a representation of soft shadows into said at least one face of said cubemap comprises:
  interpolating color or alpha values between vertex color or alpha values of said soft shadow edges and vertex color or alpha values of said edges casting shadows.

3. The method according to claim 2, wherein the step of computing soft edges comprises:
  for each edge casting shadows creating an additional polygon formed by four vertices and setting two vertices of said additional polygon to a respective endpoint of said edge casting shadows, the color or alpha value of each of said two vertices being set to full ambient darkness;
  computing, from said two vertices set to full ambient darkness, two remaining vertices at a predetermined distance from said two vertices set to full ambient darkness; and
  setting the color or alpha value of each said remaining two vertices being set to full ambient brightness.

4. The method according to the preceding claim 3 wherein the step of computing said two remaining vertices comprises:
  computing a vector given by a cross product between a normalized vector along said edge casting shadows and a normal onto a polygon surface associated to said edge casting shadows and setting the remaining two vertices of said additional polygon to points at a predetermined distance from said two vertices in a direction given by said computed vector.

5. The method according to the preceding claim 4, wherein
  the position of the remaining two vertices is further modified by computing interpolated vectors by respectively interpolating said computed vector with another vector correspondingly computed for an adjacent edge casting shadows and
  the remaining two vertices of said additional polygon are respectively set to points at a predetermined distance from said two vertices in a direction given by said interpolated vector.

6. The method according to claim 1, further comprising the steps of
  determining which sides of said cubemap requires an update based information on at least one of the viewer's position in the scene, the viewer's direction of view, the viewer's field of view, the light source's position and the position of any object moving in said scene; and
  rendering said representation of said soft shadow edges into each side of said cubemap that has been determined requiring an update.

7. The method according to claim 1, wherein the step of rendering said shadow volume polygons into the stencil buffer comprises:
  clearing the stencil buffer to a nil value;
  performing a per-pixel stencil operation
  for increasing a value present in the stencil buffer for front facing shadow volume polygons, if the depth value of the shadow volume polygon at the pixel of interest is less than the depth value stored in the z-buffer at the pixel of interest; and
  decreasing a value present in the stencil buffer for back facing shadow volume polygons, if the depth value of the shadow volume polygon at the pixel of interest is less than the depth value stored in the z-buffer at the pixel of interest.

8. The method according to the preceding claim 7, wherein the step of applying said cubemap while performing a stencil test operation comprises:
  performing a per-pixel test against values stored in the stencil buffer and preventing rendering a fragment of said scene at the pixel of interest if the value stored in the stencil buffer at the pixel of interest is different from the nil value;
  accessing said cubemap via vectors given by 3D texture coordinates, where the greatest magnitude component is used to select a face of said cubemap and the other two components are used to select a texel from said face; and
  performing a texture coordinate generation for specifying a texture coordinate and selecting a pixel of an appropriate cubemap face.

9. The method according to claim 1, wherein the steps of, from the light source's point of view, determining edges casting shadows, computing shadow volumes and soft shadow edges, creating said cubemap and rendering into at least one face of said cubemap an appropriate part of said scene and a representation of soft shadows are repeated for every light source of the scene.

10. The method according to claim 1, further comprising the steps of
  storing information on characteristic points of shadows cast in a first frame; performing the steps according to any of the preceding claims for a subsequent frame of an animation of said three-dimensional scene; and computing information on corresponding characteristic points of shadows cast in said subsequent frame; wherein soft shadows in said subsequent frame are only re-rendered if a difference value computed from corresponding characteristic points of the two frames exceeds a predetermined threshold.

11. A computer program product for rendering soft shadows in a frame representing a three-dimensional scene, which is defined by a list of polygons and comprises a plurality of three-dimensional objects, comprising:

program code means for performing, from a light source's point of view, the steps of:
determining edges casting shadows from said list of polygons;
computing shadow volumes and computing soft shadow edges from said edges casting shadows;
creating up to six squared empty textures of the same size, each of them becoming a face of a cubemap representing a cube centered at the light source's point of view, said faces of said cubemap being aligned with orthogonal major axes with the light source's position as origin;
rendering into at least one face of said cubemap an appropriate part of said scene with full brightness color and rendering a representation of soft shadows into said at least one face of said cubemap using said edges casting shadows and said soft shadow edges computed;

program code means for performing, from a point of view of a viewer viewing said scene, the steps of:
rendering a visible part of the scene into a z-buffer with colors, lighting and texture information disabled for generating depth information;
rendering said shadow volumes into a stencil buffer in combination with said z-buffer information; and
in a single pass, rendering said scene with colors, lighting and texture information enabled and applying said cubemap to said scene for rendering said representation of said soft shadows into said scene using a texture coordinate generation while performing a stencil test operation for preventing the scene to be drawn in shadowed areas, to produce a soft shadowed image.

12. The computer program product according to claim 11, wherein a program code means for rendering a representation of soft shadows into said at least one face of said cubemap comprises:

program code means for interpolating color or alpha values between vertex color or alpha values of said soft shadow edges and vertex color or alpha values of said edges casting shadows.

13. The computer program product according to claim 12, wherein a program code means for computing soft edges comprises:

program code means for creating, for each edge casting shadows, an additional polygon formed by four vertices and setting two vertices of said additional polygon to a respective endpoint of said edge casting shadows, the color or alpha value of each of said two vertices being set to full ambient darkness;

program code means for computing, from said two vertices set to full ambient darkness, two remaining vertices at a predetermined distance from said two vertices set to full ambient darkness; and program code means for setting the color or alpha value of each said remaining two vertices being set to full ambient brightness.

14. The computer program product according to the preceding claim 13, wherein the program code means for computing said two remaining vertices comprises:

program code means for computing a vector given by a cross product between a normalized vector along said edge casting shadows and a normal onto a polygon surface associated to said edge casting shadows and setting the remaining two vertices of said additional polygon to points at a predetermined distance from said two vertices in a direction given by said computed vector.

15. The computer program product according to the preceding claim 14, further comprising:

program code means for modifying the position of the remaining two vertices by computing interpolated vectors by respectively interpolating said computed vector with another vector correspondingly computed for an adjacent edge casting shadows and program code means for setting the remaining two vertices of said additional polygon respectively to points at a predetermined distance from said two vertices in a direction given by said interpolated vector.

16. The computer program product according to claim 11, further comprising:

program code means for determining which sides of said cubemap requires an update based information on at least one of the viewer's position in the scene, the viewer's direction of view, the viewer's field of view, the light source's position and the position of any object moving in said scene; and program code means for rendering said representation of said soft shadow edges into each side of said cubemap that has been determined requiring an update.

17. The computer program product according to claim 11, wherein the program code means for rendering said shadow volume polygons into the stencil buffer comprises:

program code means for clearing the stencil buffer to a nil value;

program code means for performing a per-pixel stencil operation for increasing a value present in the stencil buffer for front facing shadow volume polygons, if the depth value of the shadow volume polygon at the pixel of interest is less than the depth value stored in the z-buffer at the pixel of interest; and decreasing a value present in the stencil buffer for back facing shadow volume polygons, if the depth value of the shadow volume polygon at the pixel of interest is less than the depth value stored in the z-buffer at the pixel of interest.

18. The computer program product according to the preceding claim 17, wherein a program code means for applying said cubemap while performing a stencil test operation comprises:

program code means for performing a per-pixel test against values stored in the stencil buffer and preventing rendering a fragment of said scene at the pixel of interest if the value stored in the stencil buffer at the pixel of interest is different from the nil value;

program code means for accessing said cubemap via vectors given by 3D texture coordinates, where the greatest magnitude component is used to select a face of said cubemap and the other two components are used to select a texel from said face; and program code means for performing a texture coordinate generation for specifying a texture coordinate and selecting a pixel of an appropriate cubemap face.

19. The computer program product according to claim 11, wherein program code means for, from the light source's point of view, determining edges casting shadows, computing shadow volumes and soft shadow edges, creating said cubemap and rendering into at least one face of said cubemap an appropriate part of said scene and a representation of soft shadows are repeatedly operated for every light source of the scene.

20. The computer program product according to claim 11, further comprising:

program code means for storing information on characteristic points of shadows cast in a first frame;

program code means for performing the steps according to claim 11 for a subsequent frame of an animation of said three-dimensional scene; and program code means for computing information on corresponding characteristic points of shadows cast in said subsequent frame; and program code means for re-rendering soft shadows in said subsequent frame only if a difference value computed from corresponding characteristic points of the two frames exceeds a predetermined threshold.

21. A system for rendering a three-dimensional scene comprising a plurality of three-dimensional objects formed by polygons and for rendering soft shadows in said scene:

a) a color buffer for storing color values;

b) a z-buffer for storing depth values;

c) a stencil buffer for storing stencil mask information;

d) texture memory for storing texture information;

e) a rasterizer for converting each of the polygons into color, depth and stencil values;

f) a first pixel engine in communication with the rasterizer and the texture memory for copying or drawing directly a portion of the color buffer into an appropriate texture representing a specific cubemap side;

g) a second pixel engine in communication with the rasterizer, the z-buffer and the stencil buffer for receiving said polygons and performing a depth compare operation and a stencil test operation based on the result of the depth compare operation; and h) a third pixel engine in communication with the rasterizer, the z-buffer, the stencil buffer and the texture memory for receiving said polygons and performing a depth compare operation, a stencil test operation and a texture coordinate generation operation, based on the result from the depth compare and stencil test, for transferring into the non-shadowed areas of the frame buffer the appropriate pixels of the appropriate side of the cubemap.

22. The system according to the preceding claim 21, further comprising an alpha buffer for rendering into the cubemap 8 bit alpha values instead of 24 bit RGB values or any other value stored in the color buffer.

* * * * *